US010338600B2

(12) United States Patent
Yoon et al.

(10) Patent No.: US 10,338,600 B2
(45) Date of Patent: Jul. 2, 2019

(54) AUTONOMOUS DRIVING CONTROL APPARATUS, VEHICLE HAVING THE SAME, AND METHOD FOR CONTROLLING THE SAME

(71) Applicant: HYUNDAI MOTOR COMPANY, Seoul (KR)

(72) Inventors: Sung Won Yoon, Yongin-si (KR); Goodo Kwon, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 195 days.

(21) Appl. No.: 15/385,617

(22) Filed: Dec. 20, 2016

(65) Prior Publication Data

US 2018/0101178 A1    Apr. 12, 2018

(30) Foreign Application Priority Data

Oct. 12, 2016    (KR) .................. 10-2016-0131796

(51) Int. Cl.
*G01C 22/00*       (2006.01)
*G05D 1/00*        (2006.01)
(Continued)

(52) U.S. Cl.
CPC ....... *G05D 1/0253* (2013.01); *G06K 9/00791* (2013.01); *G06K 9/4671* (2013.01);
(Continued)

(58) Field of Classification Search
CPC ......... G05D 1/0253; G05D 2201/0213; G06K 9/00791; G06K 9/4671; G06N 3/0454; G06N 99/005
See application file for complete search history.

(56) References Cited

U.S. PATENT DOCUMENTS 5,991,428 A    11/1999    Taniguchi
8,000,498 B2    8/2011    Shih et al.
(Continued)

FOREIGN PATENT DOCUMENTS

JP    2001-119723 A    4/2001
JP    2011-22157 A    2/2011
(Continued)

OTHER PUBLICATIONS

Jain et al., "MoDeep: A Deep Learning Framework Using Motion Features for Human Pose Estimation", New York University, 2014, pp. 1-15.
(Continued)

*Primary Examiner* — Harry Y Oh
(74) *Attorney, Agent, or Firm* — Knobbe Martens Olson & Bear LLP

(57) ABSTRACT

A vehicle according to the present disclosure includes a vehicle body, an image acquirer provided in the vehicle body and configured to acquire an image of a road and a surrounding of the road, and an autonomous driving control apparatus. The driving control apparatus is configured to receive a first image and a second image in real time from the image acquirer, detect a moving object in each of the first image and the second image, compare the first image from which the moving object is removed with the second image from which the moving object is removed to recognize a change in position of the vehicle body, and control driving of the vehicle based on the recognized change in position of the vehicle body.

18 Claims, 34 Drawing Sheets

(51) Int. Cl.
  *G05D 1/02*   (2006.01)
  *G06N 20/00*  (2019.01)
  *G06K 9/00*   (2006.01)
  *G06K 9/46*   (2006.01)
  *G06N 3/04*   (2006.01)
(52) U.S. Cl.
  CPC ..... *G06N 20/00* (2019.01); *G05D 2201/0213* (2013.01); *G06N 3/0454* (2013.01)

(56) References Cited

U.S. PATENT DOCUMENTS

| | | | |
|---|---|---|---|
| 9,097,532 B2 | 8/2015 | Kotaba et al. | |
| 9,476,970 B1* | 10/2016 | Fairfield | G06T 7/74 |
| 2011/0251768 A1* | 10/2011 | Luo | B60W 30/12 |
| | | | 701/70 |
| 2012/0170808 A1* | 7/2012 | Ogata | B60R 21/0134 |
| | | | 382/103 |
| 2016/0063330 A1 | 3/2016 | Xu et al. | |

FOREIGN PATENT DOCUMENTS

| | | |
|---|---|---|
| JP | 2011-257984 A | 12/2011 |
| JP | 2015-14819 A | 1/2015 |
| KR | 10-2014-0071138 A | 6/2014 |

OTHER PUBLICATIONS

Enzweiler et al., "Monocular Pedestrian Recognition Using Motion Parallax", 2008 IEEE Intelligent Vehicles Symposium, Eindhoven University of Technology, Jun. 2008, pp. 792-797.

* cited by examiner

FIG. 8

| | | | | | | | |
|---|---|---|---|---|---|---|---|
| 1 | 1 | 1 | 1 | 1 | 1 | 1 | ~R1 |
| 1 | 1 | 1 | 1 | 1 | 1 | 1 | |
| 1 | 0.5 | 0.5 | 0.5 | 0.5 | 0.5 | 1 | ~R3 |
| 1 | 0.5 | 0 | 0 | 0 | 0.5 | 1 | ~R2 |
| 1 | 0.5 | 0 | 0 | 0 | 0.5 | 1 | |
| 1 | 0.5 | 0 | 0 | 0 | 0.5 | 1 | |
| 1 | 0.5 | 0.5 | 0.5 | 0.5 | 0.5 | 1 | |
| 1 | 1 | 1 | 1 | 1 | 1 | 1 | |

FIG. 9

| | | | | | | 191b |
|---|---|---|---|---|---|---|
| 0 | 38 | 1 | 486 | 750 | 1 | 1 |
| 10 | 55 | 10 | 1 | 685 | 55 | 1 |
| 440 | 870 | 10 | 10 | 10 | 2 | 1 |
| 500 | 56 | 720 | 146 | 10 | 750 | 250 |
| 35 | 110 | 0 | 53 | 900 | 60 | 500 |
| 0 | 252 | 0 | 0 | 888 | 300 | 1 |
| 1 | 540 | 530 | 2 | 2 | 100 | 1 |
| 123 | 1 | 1 | 1 | 1 | 1 | 1 |

FIG. 10

| | | | | | | | |
|---|---|---|---|---|---|---|---|
| 0 | 38 | 1 | 486 | 750 | 1 | 1 | — R1 |
| 10 | 55 | 10 | 1 | 685 | 55 | 1 | |
| 440 | 435 | 5 | 5 | 5 | 1 | 1 | — R3 |
| 500 | 28 | 0 | 0 | 0 | 375 | 250 | — R2 |
| 35 | 55 | 0 | 0 | 0 | 30 | 500 | |
| 0 | 126 | 0 | 0 | 0 | 150 | 1 | |
| 1 | 270 | 265 | 1 | 1 | 50 | 1 | |
| 123 | 1 | 1 | 1 | 1 | 1 | 1 | |

|   |   |   |   |   |   |   |
|---|---|---|---|---|---|---|
| 0 | 0 | 0 | 0 | 0 | 0 | 0 |
| 0 | 0 | 0 | 0 | 0 | 0 | 0 |
| 0 | 0.5 | 0.5 | 0.5 | 0.5 | 0.5 | 0 |
| 0 | 0.5 | 1 | 1 | 1 | 0.5 | 0 |
| 0 | 0.5 | 1 | 1 | 1 | 0.5 | 0 |
| 0 | 0.5 | 1 | 1 | 1 | 0.5 | 0 |
| 0 | 0.5 | 0.5 | 0.5 | 0.5 | 0.5 | 0 |
| 0 | 0 | 0 | 0 | 0 | 0 | 0 |

| 0 | 0 | 0 | 0 | 0 | 0 | 0 |
|---|---|---|---|---|---|---|
| 0 | 0 | 0 | 0 | 0 | 0 | 0 |
| 0 | 435 | 5 | 5 | 5 | 1 | 0 |
| 0 | 28 | 720 | 146 | 10 | 375 | 0 |
| 0 | 55 | 0 | 53 | 900 | 30 | 0 |
| 0 | 126 | 0 | 0 | 888 | 150 | 0 |
| 0 | 270 | 265 | 1 | 1 | 50 | 0 |
| 0 | 0 | 0 | 0 | 0 | 0 | 0 |

FIG. 15

| | | | | | | | |
|---|---|---|---|---|---|---|---|
| 1 | 1 | 1 | 1 | 1 | 1 | 1 | ~R1 |
| 1 | 1 | 1 | 1 | 1 | 1 | 1 | |
| 1 | 0.5 | 0.5 | 0.5 | 0.5 | 0.5 | 1 | ~R3 |
| 1 | 0.5 | 0 | 0 | 0 | 0.5 | 1 | ~R2 |
| 1 | 0.5 | 0 | 0 | 0 | 0.5 | 1 | |
| 1 | 0.5 | 0 | 0 | 0 | 0.5 | 1 | |
| 1 | 0.5 | 0.5 | 0.5 | 0.5 | 0.5 | 1 | |
| 1 | 1 | 1 | 1 | 1 | 1 | 1 | |

| | | | | | 192b | |
|---|---|---|---|---|---|---|
| 1 | 0 | 38 | 1 | 486 | 750 | 1 |
| 1 | 10 | 55 | 10 | 10 | 685 | 55 |
| 120 | 440 | 870 | 10 | 10 | 10 | 2 |
| 740 | 500 | 56 | 750 | 146 | 10 | 750 |
| 1 | 35 | 900 | 53 | 53 | 60 | 60 |
| 0 | 252 | 888 | 0 | 0 | 300 | 1 |
| 1 | 1 | 540 | 530 | 2 | 2 | 100 |
| 1 | 123 | 1 | 1 | 1 | 1 | 1 |

FIG. 18

| 1 | 0 | 38 | 1 | 486 | 750 | 1 | R1 |
|---|---|---|---|---|---|---|---|
| 1 | 10 | 55 | 10 | 10 | 685 | 55 | |
| 120 | 220 | 435 | 5 | 5 | 5 | 2 | R3 |
| 740 | 250 | 0 | 0 | 0 | 5 | 750 | R2 |
| 1 | 18 | 0 | 0 | 0 | 30 | 60 | |
| 0 | 176 | 0 | 0 | 0 | 150 | 1 | |
| 1 | 0.5 | 270 | 265 | 1 | 1 | 100 | |
| 1 | 123 | 1 | 1 | 1 | 1 | 1 | |

| | | | | | | | |
|---|---|---|---|---|---|---|---|
| 0 | 0 | 0 | 0 | 0 | 0 | 0 | — R1 |
| 0 | 0 | 0 | 0 | 0 | 0 | 0 | |
| 0 | 0.5 | 0.5 | 0.5 | 0.5 | 0.5 | 0 | — R3 |
| 0 | 0.5 | 1 | 1 | 1 | 0.5 | 0 | — R2 |
| 0 | 0.5 | 1 | 1 | 1 | 0.5 | 0 | |
| 0 | 0.5 | 1 | 1 | 1 | 0.5 | 0 | |
| 0 | 0.5 | 0.5 | 0.5 | 0.5 | 0.5 | 0 | |
| 0 | 0 | 0 | 0 | 0 | 0 | 0 | |

| | | | | | | 192e | |
|---|---|---|---|---|---|---|---|
| 0 | 0 | 0 | 0 | 0 | 0 | 0 | —R1 |
| 0 | 0 | 0 | 0 | 0 | 0 | 0 | |
| 2 | 220 | 435 | 5 | 5 | 5 | 2 | —R3 |
| 0 | 250 | 56 | 750 | 146 | 5 | 750 | —R2 |
| 1 | 18 | 900 | 53 | 53 | 30 | 60 | |
| 0 | 176 | 888 | 0 | 0 | 150 | 1 | |
| 2 | 0.5 | 270 | 265 | 1 | 1 | 100 | |
| 1 | 123 | 1 | 1 | 1 | 1 | 1 | |

FIG. 21

| | | | | | | | |
|---|---|---|---|---|---|---|---|
| 0 | 0 | 0 | 0 | 0 | 0 | 0 | — R1 |
| 0 | 0 | 0 | 0 | 0 | 0 | 0 | |
| 2 | 220 | 435 | 5 | 5 | 5 | 2 | — R3 |
| 0 | 250 | 56 | 750 | 146 | 5 | 750 | — R2 |
| 1 | 18 | 900 | 53 | 53 | 30 | 60 | |
| 0 | 176 | 888 | 0 | 0 | 150 | 1 | |
| 1 | 0.5 | 270 | 265 | 1 | 1 | 100 | |
| 1 | 123 | 1 | 1 | 1 | 1 | 1 | |

| A1 | A2 | A3 | 486 | 750 | A6 | A7 |
|----|----|----|-----|-----|----|----|
| B1 | B2 | B3 | B4 | 685 | B6 | B7 |
| 440 | 870 | C3 | C4 | C5 | C6 | C7 |
| 500 | D2 | D3 | D4 | D5 | 750 | 250 |
| E1 | E2 | E3 | E4 | E5 | E6 | 500 |
| F1 | F2 | F3 | F4 | F5 | F6 | F7 |
| G1 | 540 | 530 | G4 | G5 | G6 | G7 |
| H1 | H2 | H3 | H4 | H5 | H6 | H7 |

FIG. 24A

|     |     |     |     |     |     |     |
|-----|-----|-----|-----|-----|-----|-----|
| A1  | A2  | A3  | A4  | A5  | A6  | A7  |
| B1  | B2  | B3  | B4  | B5  | B6  | B7  |
| C1  | 870 | C3  | C4  | C5  | C6  | C7  |
| D1  | D2  | 720 | D4  | D5  | 750 | D7  |
| E1  | E2  | E3  | E4  | 900 | E6  | E7  |
| F1  | F2  | F3  | F4  | 888 | F6  | F7  |
| G1  | G2  | G3  | G4  | G5  | G6  | G7  |
| H1  | H2  | H3  | H4  | H5  | H6  | H7  |

FIG. 24B

|  | A1 | A2 | A3 | A4 | A5 | A6 | A7 |
|---|---|---|---|---|---|---|---|
|  | B1 | B2 | B3 | B4 | B5 | B6 | B7 |
|  | C1 | 870 | C3 | C4 | C5 | C6 | C7 |
|  | D1 | D2 | 750 | D4 | D5 | D6 | D7 |
|  | E1 | 900 | E3 | E4 | E5 | E6 | E7 |
|  | F1 | 888 | F3 | F4 | F5 | F6 | F7 |
|  | G1 | G2 | G3 | G4 | G5 | G6 | G7 |
|  | H1 | H2 | H3 | H4 | H5 | H6 | H7 |

FIG. 25

| | | | | | | | |
|---|---|---|---|---|---|---|---|
| A1 | A2 | A3 | A4 | A5 | A6 | A7 | —R1 |
| B1 | B2 | B3 | B4 | B5 | B6 | B7 | |
| C1 | 870 | C3 | C4 | C5 | C6 | C7 | —R3 |
| D1 | D2 | 720 | D4 | D5 | 750 | D7 | —D6 |
| E1 | E2 | E3 | E4 | 900 | E6 | E7 | —E5 |
| F1 | F2 | F3 | F4 | 888 | F6 | F7 | —F5 / R2 |
| G1 | G2 | G3 | G4 | G5 | G6 | G7 | |
| H1 | H2 | H3 | H4 | H5 | H6 | H7 | |

|     | A1  | A2  | A3  | A4 486 | A5 750 | A6  | A7  |
|-----|-----|-----|-----|-----|-----|-----|-----|
|     | B1  | B2  | B3  | B4  | B5 685 | B6  | B7  |
|     | C1 440 | C2 870 | C3  | C4  | C5  | C6  | C7  |
|     | D1 500 | D2  | D3  | D4  | D5  | D6 750 | D7 250 |
|     | E1  | E2  | E3  | E4  | E5  | E6  | E7 500 |
|     | F1  | F2  | F3  | F4  | F5  | F6  | F7  |
|     | G1  | G2 540 | G3 530 | G4  | G5  | G6  | G7  |
|     | H1  | H2  | H3  | H4  | H5  | H6  | H7  |

|    | 1  | 2  | 3  | 4  | 5   | 6   | 7  |
|----|----|----|----|----|-----|-----|----|
| A  | A1 | A2 | A3 | A4 | A5  | A6  | A7 |
| B  | B1 | B2 | B3 | B4 | B5  | B6  | B7 |
| C  | C1 | 870| C3 | C4 | C5  | C6  | C7 |
| D  | D1 | D2 | 720| D4 | D5  | 750 | D7 |
| E  | E1 | E2 | E3 | E4 | 900 | E6  | E7 |
| F  | F1 | F2 | F3 | F4 | 888 | F6  | F7 |
| G  | G1 | G2 | G3 | G4 | G5  | G6  | G7 |
| H  | H1 | H2 | H3 | H4 | H5  | H6  | H7 |

FIG. 26D

| | A1 | A2 | A3 | A4 | A5 | A6 | A7 | —R1 |
|---|---|---|---|---|---|---|---|---|
| | B1 | B2 | B3 | B4 | B5 | B6 | B7 | |
| C2— | C1 | 870 | C3 | C4 | C5 | C6 | C7 | —R3 |
| D3— | D1 | D2 | 750 | D4 | D5 | D6 | D7 | |
| E2— | E1 | 900 | E3 | E4 | E5 | E6 | E7 | |
| F2— | F1 | 888 | F3 | F4 | F5 | F6 | F7 | —R2 |
| | G1 | G2 | G3 | G4 | G5 | G6 | G7 | |
| | H1 | H2 | H3 | H4 | H5 | H6 | H7 | |

| 0 | 38 | 1 | 486 | 750 | 1 | 1 |
|---|---|---|---|---|---|---|
| 10 | 55 | 10 | 10 | 685 | 55 | 1 |
| 440 | 435 | 5 | 5 | 5 | 1 | 1 |
| 500 | 28 | 0 | 0 | 0 | 375 | 250 |
| 35 | 55 | 0 | 0 | 0 | 30 | 500 |
| 0 | 126 | 0 | 0 | 0 | 150 | 1 |
| 1 | 270 | 265 | G4 | G5 | G6 | 1 |
| 123 | 1 | 1 | 1 | 1 | 1 | 1 |

AUTONOMOUS DRIVING CONTROL APPARATUS, VEHICLE HAVING THE SAME, AND METHOD FOR CONTROLLING THE SAME

CROSS-REFERENCE TO RELATED APPLICATION

This application claims the benefit of Korean Patent Application No. 10-2016-0131796, filed on Oct. 12, 2016 in the Korean Intellectual Property Office, the disclosure of which is incorporated herein by reference.

BACKGROUND

1. Field

The present disclosure relates to an autonomous driving control apparatus for recognizing a change in position of a vehicle itself, a vehicle having the same, and a method for controlling the same.

2. Description of the Related Art

A vehicle is an apparatus in which vehicle wheels are driven to travel on a road. Various devices for protecting a passenger, assisting in driving a vehicle, and improving riding comfort are embedded in the vehicle.

These days, an autonomous driving control apparatus configured to enable a vehicle to be automatically driven to a destination by controlling the vehicle itself to recognize a road environment and determine a driving condition and to be driven along a planned driving path is provided in the vehicle, and research on such a technology is being vigorously carried out.

An autonomous driving control apparatus recognizes a change in position of a vehicle itself and a change in position of an object and generates a driving path for avoiding the object in real time.

The disclosure of this section is to provide background of the invention. Applicant notes that this section may contain information available before this application. However, by providing this section, Applicant does not admit that any information contained in this section constitutes prior art.

SUMMARY

A technology for recognizing a change in position of a vehicle itself and a change in position of an object includes a technology of processing an image of a surrounding of a vehicle itself.

That is, an autonomous driving control apparatus recognizes a change in position of a vehicle itself using an image processing technology and recognizes a change in position of an object from the recognized change in position of the vehicle itself.

Here, there are problems in that an image processing speed is slowed as a number of feature points in an image being processed increases, and position recognition performance is degraded.

Due to the above, when an autonomous driving control apparatus controls driving of a vehicle, since a speed at which changes are reflected in positions of a vehicle itself and a nearby vehicle is slow, stable driving of the vehicle itself may be impossible and a danger of colliding with an object may be increased.

It is an aspect of the present disclosure to provide an autonomous driving control apparatus that uses deep-learning to detect a moving object within an image and uses a feature point of a fixed object, rather than a feature point of the moving object, in the image to recognize a position of a vehicle itself, a vehicle having the same, and a method for controlling the same.

It is another aspect of the present disclosure to provide an autonomous driving control apparatus that divides an image into a first area in which a fixed object is detected, a second area in which a moving object is detected, and a third area which is a boundary between the first area and the second area to search for a feature point of the fixed object among feature points in the third area to recognize a position of a vehicle itself, a vehicle having the same, and a method for controlling the same.

According to an aspect, an autonomous driving control apparatus provided at a movable apparatus includes a storage configured to store a plurality of pieces of data, an image acquirer configured to acquire an image of a surrounding, and a controller configured to receive a first image and a second image acquired by the image acquirer, detect a fixed object in each of the first image and the second image based on the plurality of pieces of data, compare a position of the fixed object in the first image with a position of the fixed object in the second image to recognize a change in position of the fixed object, recognize a change in position of the movable apparatus based on the recognized change in position of the fixed object, and control driving on the basis of the recognized change in position of the movable apparatus.

According to an aspect, the second image of the autonomous driving control apparatus may include an image acquired at a time point at which a certain amount of time has elapsed from a time point at which the first image is acquired.

According to an aspect, the controller of the autonomous driving control apparatus may perform deep-learning on the first image and the second image to check at least one of line information, pixel information, surface information, shape information, color distribution information, and size information from the first image and the second image and may compare the at least one checked information with the plurality of pieces of data to detect the fixed object.

According to an aspect, the controller of the autonomous driving control apparatus may use information regarding the deep-learning performed on the first image and the second image to update data of the storage.

According to an aspect, the controller of the autonomous driving control apparatus may perform the deep-learning on the first image and the second image to detect a moving object in each of the first image and the second image and control the driving on the basis of changes in positions of the moving object in the first image and the moving object in the second image and the change in position of the fixed object.

According to an aspect, the plurality of data of the autonomous driving control apparatus may include image information and state information on a plurality of objects.

According to another aspect, a vehicle includes a vehicle body, an image acquirer provided in the vehicle body and configured to acquire an image of a road and a surrounding of the road, and an autonomous driving control apparatus configured to receive a first image and a second image in real time, detect a fixed object in each of the first image and the second image based on a plurality of pieces of data which are pre-stored, compare a position of the fixed object in the first image with a position of the fixed object in the second image to recognize a change in position of the vehicle body, and control driving on the basis of the recognized change in position of the vehicle body.

The autonomous driving control apparatus of the vehicle may perform deep-learning on the first image and the second image to check at least one of line information, pixel information, surface information, shape information, color distribution information, and size information from the first image and the second image and may compare the at least one checked information with the plurality of pieces of data to detect the fixed object.

The autonomous driving control apparatus of the vehicle may use information on the deep-learning that is being performed on the first image and the second image to update the plurality of pieces of data.

The autonomous driving control apparatus of the vehicle may perform deep-learning on the first image and the second image to detect a moving object in each of the first image and the second image and control driving on the basis of changes in positions of the moving object in the first image and the moving object in the second image and the change in position of the fixed object.

The autonomous driving control apparatus of the vehicle may divide an area of each of the first image and the second image into a first area in which the fixed object is detected, a second area in which the moving object is detected, and a third area which is a boundary between the first area and the second area, extract feature points from the first, second, and third areas of the first image and the second image, and compare positions of the feature points in the first image with positions of the feature points in the second image for each of the areas to check whether positions of the feature points change in each of the areas.

The autonomous driving control apparatus of the vehicle may check the feature values of feature points in the third area of each of the first image and the second image and determine feature points of the fixed object among the feature points in the third area of each of the first image and the second image based on the checked feature values of the feature points.

The autonomous driving control apparatus of the vehicle may check the feature values of feature points in the first area and the third area of each of the first image and the second image and determine that feature points having a feature value equal to or greater than a first predetermined feature value among the checked feature values of the feature points are representative feature points of the fixed object.

The autonomous driving control apparatus of the vehicle may compare the representative feature points of a fixed object in the first image with representative feature points of a fixed object in the second image to check whether the representative feature points match, and may determine that the representative feature points that match are valid feature points of the fixed object in the first image and the second image.

The autonomous driving control apparatus of the vehicle may determine that feature points having a feature value equal to or greater than a second predetermined feature value among feature values of the feature points in the second area and the third area of each of the first image and the second image are representative feature points of a moving object and recognize a change in position of the moving object on the basis of the representative feature points in the first image and the second image.

The autonomous driving control apparatus of the vehicle may compare the representative feature points of the moving object in the first image with representative feature points of the moving object in the second image to check whether the feature points match, and may determine that the representative feature points that match are valid feature points of the moving object in the first image and the second image.

When one or more valid feature points of a fixed object that match a valid feature point of a moving object exist among valid feature points in the third area of each of the first image and the second image, the autonomous driving control apparatus of the vehicle may remove the one or more matching valid feature points from the valid feature points of the fixed object.

According to yet another aspect, a method for controlling a vehicle for autonomous driving includes acquiring images in real time, selecting a first image and a second image from the acquired images, detecting a fixed object in each of the first image and the second mage on the basis of a plurality of pieces of data which are pre-stored, comparing a position of the fixed object in the first image with a position of the fixed object in the second image to recognize a change in position of the fixed object, recognizing a change in position of the vehicle itself on the basis of the recognized change in position of the fixed object, and controlling driving based on the recognized change in position of the vehicle itself.

The recognizing of the change in position of the fixed object and the change in position of the moving object may include dividing an area of each of the first image and the second image into a first area in which the fixed object is detected, a second area in which the moving object is detected, and a third area which is a boundary between the first area and the second area, extracting feature points in the first, second, and third areas of the first image and the second image, and comparing positions of the feature points in the first image with positions of the feature points in the second image for each of the areas to check whether positions of the feature points change in each of the areas.

The recognizing of the change in position of the fixed object and the change in position of the moving object may include checking feature values of feature points in the first area, the second area, and the third area of each of the first image and the second image, determining that feature points having a feature value equal to or greater than a first predetermined feature value among feature values of feature points in the first and second areas of each of the first image and the second image are representative feature points of the fixed object, comparing positions of the representative feature points of the fixed object in each of the first image and the second image to recognize the change in position of the fixed object, determining that feature points having a feature value equal to or greater than a second predetermined feature value among feature values of the feature points in the second area and the third area of each of the first image and the second image are representative feature points of the moving object, and comparing positions of representative feature points of the moving object in each of the first image and the second image to recognize a change in position of the moving object.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of embodiments, taken in conjunction with the accompanying drawings of which:

FIGS. 7 to 13 illustrate image processing of the first image of the autonomous driving control apparatus provided in the vehicle according to an embodiment;

FIGS. 14 to 21 illustrate image processing of the second image of the autonomous driving control apparatus provided in the vehicle according to an embodiment;

FIGS. 22A and 22B illustrates first matching images of the first image and the second image of the autonomous driving control apparatus provided in the vehicle according to an embodiment;

FIGS. 23A and 23B illustrate removing invalid feature points from the first matching images of FIGS. 22A and 22B, respectively;

FIGS. 24A and 24B illustrate second matching images of the first image and the second image of the autonomous driving control apparatus provided in the vehicle according to an embodiment;

FIG. 25 illustrates removing invalid feature points from the second matching image of the first image of FIG. 24A;

FIGS. 26A, 26B, 26C, and 26D illustrate first and second valid images of the first image and the second image of the autonomous driving control apparatus provided in the vehicle according to an embodiment; and FIG. 27 illustrates feature points in a third area of each of the first image and the second image of the autonomous driving control apparatus provided in the vehicle according to an embodiment are distinguished.

DETAILED DESCRIPTION

Figure 1:
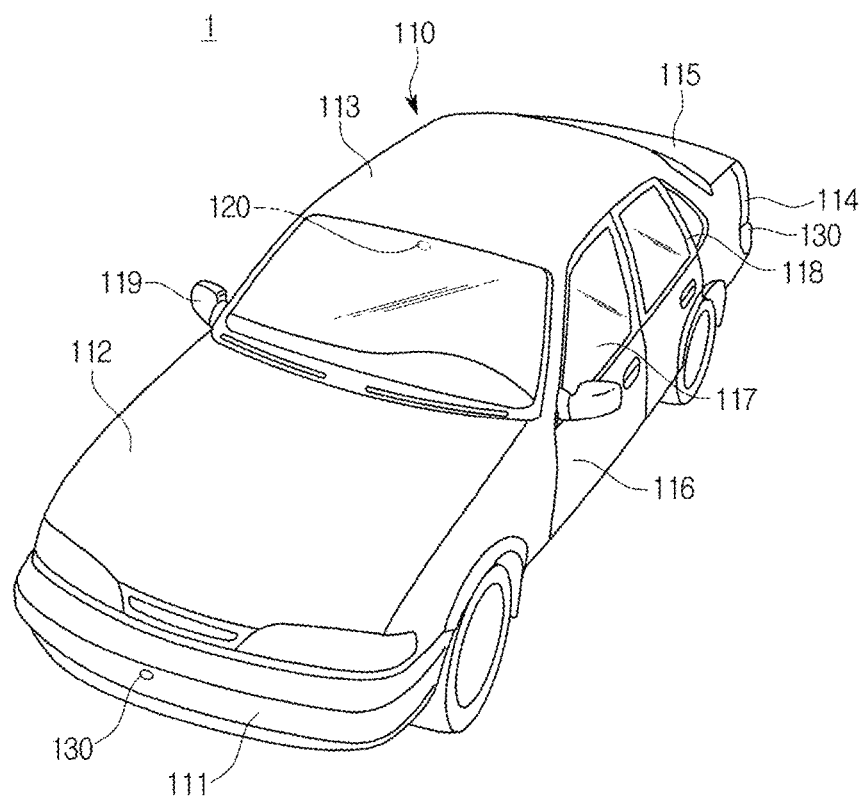
FIG. 1 illustrates an exterior of a vehicle according to an embodiment.

Hereinafter, the present disclosure will be described in detail with reference to the accompanying drawings.

A system and method for determining a vehicle's movement is disclosed. A computing device installed in the vehicle processes a sequence of two or more images (frames of a video, 191b, 192b) captured at camera 120 facing front of the vehicle. The computing device processes the images to identify at least one object fixed to the ground (buildings, trees) and determines movement of the identified fixed objects in the sequence of images. Movement of the subject vehicle during a time period corresponding to the image sequence can be determined using the movement of the fixed objects.

The images captures from the camera 120 have a central section (R2 in FIG. 7), a peripheral section (R1 in FIG. 7), and an intermediate section (R3 in FIG. 7) between the central section and the peripheral section. In embodiments, in processing of the images to identify image components (pixels) representing the fixed object(s), the computing device applies a filter having different weights for different sections of the images. As illustrated in FIG. 8, a higher weight is applied to the peripheral section and lower weight is applied to the central section such that a proceeding vehicle represented by image components in the central segment can be excluded in detecting the fixed object and determining movement of the fixed objects. In embodiments, candidates of fixed object(s) are determined using the filtered sequence of the images (191f, 192f in FIGS. 22A and 22B).

In embodiments, the computing device processed the captured images to identify at least one moving object that is not fixed to the ground like a preceding vehicle. In embodiments, another filter (mask 191d in FIG. 12) having a lower weight for the peripheral section and a higher weight for the central section is applied such that a streetlight or a road sign represented by image components in the peripheral segment can be excluded in detecting candidates of moving object(s). In embodiment, when an image component is identified as a candidate of fixed object and as a candidate of moving object at the same time, the image component can be disqualified as a candidate of fixed object (determined to be an invalid feature point) to enhance accuracy of detecting a fixed objects.

An autonomous driving apparatus is an apparatus that detects nearby objects and is able to move itself based on position information of the detected objects. Examples of an autonomous driving apparatus may include a humanoid robot, a pet robot, a cleaning robot, and a vehicle.

Among the above examples, a vehicle is an apparatus in which vehicle wheels are driven to travel on a road for a purpose of transporting people or freight and may include an autonomous driving control apparatus configured to detect objects near the road and enable the vehicle to be self-driven based on position information of the detected objects and road lane information.

According to embodiments of the present invention, among autonomous driving apparatuses, a vehicle will be described as an example.

Figure 2:
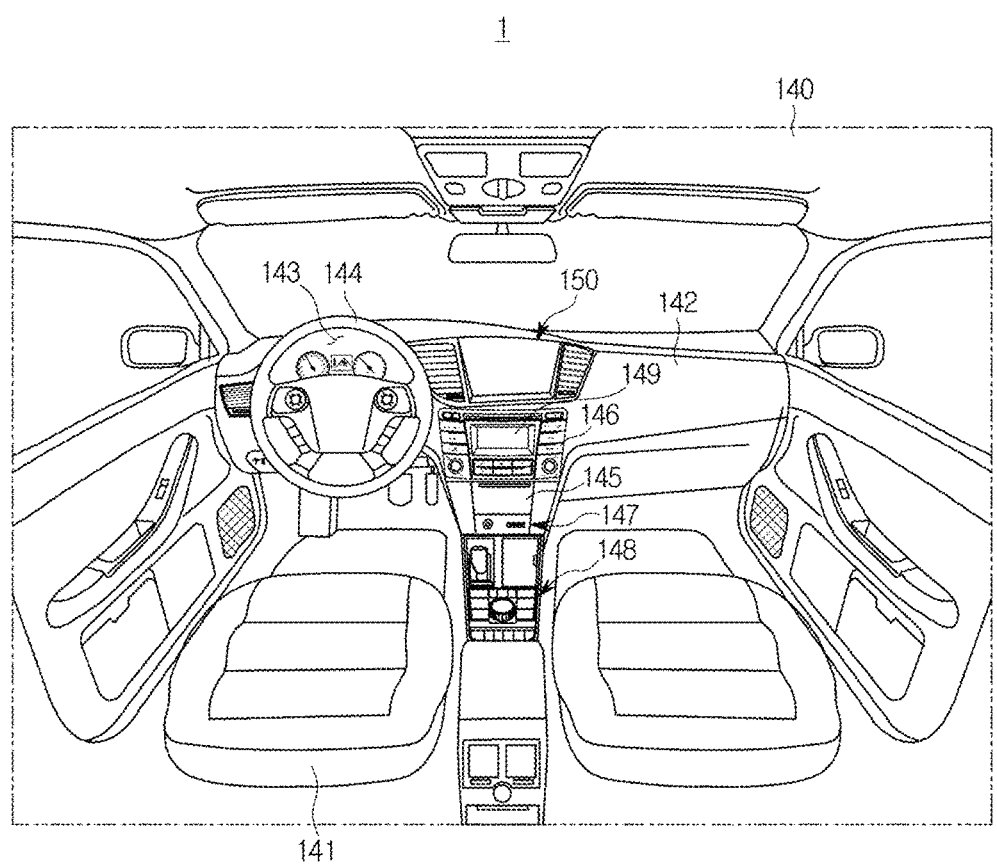
FIG. 2 illustrates an interior of the vehicle according to an embodiment.

FIG. 1 illustrates an exterior of a vehicle according to an embodiment, and FIG. 2 illustrates of an interior of the vehicle according to an embodiment A vehicle 1 includes a vehicle body having an interior and an exterior and a chassis configured to occupy remaining portions except the vehicle body to have mechanical devices required for driving installed thereon.

As illustrated in FIG. 1, an exterior 110 of the vehicle body includes a front panel 111, a bonnet 112, a roof panel 113, a rear panel 114, a trunk 115, front-left, front-right, rear-left, and rear-right doors 116, and windshields 117 configured at the front-left, front-right, rear-left, and rear-right doors 116 to be opened and closed.

Also, the exterior of the vehicle body further includes a filler 118 provided at boundaries between windshields of the front panel, the bonnet, the roof panel, the rear panel, the trunk, and the front-left, front-right, rear-left, and rear-right doors and a side mirror 119 configured to provide a driver with a field of view behind the vehicle 1.

The vehicle 1 includes an image acquirer 120 configured to acquire an image of a road and a surrounding of the road.

The image acquirer 120 may be a camera that includes a charge-coupled device (CCD) or a complimentary metal-oxide semiconductor (CMOS) image sensor.

The image acquirer 120 may be provided at a windshield at a side of a windshield inside the vehicle, may be provided at a rear-view mirror inside the vehicle, or may be provided at the roof panel 113 to be exposed to the outside.

The vehicle may further include a distance detector 130 configured to detect a distance from the vehicle to other vehicles in front of, behind, at the left of, and at the right of the vehicle.

The distance detector 130 may include an ultrasonic sensor, an image sensor, a radar sensor, or a light detection and ranging (LIDAR) sensor.

The distance detector 130 may be provided on at least one of the front panel 111, the roof panel 113, and the rear panel 114 of the vehicle.

As illustrated in FIG. 2, an interior 140 of the vehicle body includes a seat 141 configured to have a passenger seated thereon, a dashboard 142, an instrument panel (i.e., a cluster 143) arranged on the dashboard and configured to have a tachometer, a speedometer, a coolant thermometer, a fuel gauge, a turn signal indicator, a high beam indicator light, a warning light, a seat belt warning light, a tachometer, an odometer, an automatic transmission selection lever indicator light, a door open warning light, an engine oil warning light, and a low fuel warning light arranged thereon, a steering wheel 144 configured to control a direction of the vehicle, and a center fascia 145 having an air outlet and an adjustment plate of an air conditioner and an audio device arranged thereon.

The steering wheel 144 is an apparatus for controlling a driving direction of the vehicle 1 and may include a rim gripped by a driver and a spoke connected to a steering mechanism of the vehicle 1 and configured to connect the rim to a hub of a rotating shaft for steering.

Further, the spoke may include an operating device configured to control various types of devices in the vehicle 1, e.g., an audio apparatus.

The center fascia 145 may include a head unit 146, a multi-terminal 147, etc. configured to control the audio device, the air conditioner, and a heater.

Here, the multi-terminal 147 may be arranged adjacent to the head unit 146, may include a universal serial bus (USB) port and an auxiliary (AUX) port, and may further include a secure digital (SD) slot.

The vehicle 1 may further include an input unit 148 configured to receive operation commands for various types of functions.

The input unit 148 may be provided at the head unit 146 and the center fascia 145 and may include one or more physical buttons such as operation on/off buttons for various types of functions and buttons for changing set values for various types of functions.

The input unit 148 may include a touch panel integrally provided at a display of a vehicle terminal 150. The input unit 148 receives position information of a button displayed on the display of the vehicle terminal 150.

The input unit 148 may further include a jog dial or a touch pad configured to receive a movement command, a selection command, etc. for a cursor displayed on the display of the vehicle terminal 150.

Here, the jog dial or the touch pad may be provided at the center fascia and the like.

The vehicle 1 may further include a display 149 provided at the head unit and configured to display information on a function that is currently being performed and information input by a user.

Further, the vehicle 1 may also display the information on a function that is currently being performed and the information input by the user on the display of the vehicle terminal 150.

The vehicle terminal 150 may be mounted and installed at the dashboard.

The vehicle terminal 150 may perform an audio function, a video function, a navigation function, a digital multimedia broadcasting (DMB) function, and a radio function, may display an image in front of, behind, at the left of, and at the right of the vehicle in an autonomous driving mode, and may display map information and route guidance information.

The vehicle further includes an actuating device, such as a power generation device, a power train, a driving control device, a steering device, a brake device, a suspension device, a transmission device, a fuel device, etc., configured to apply a driving force and a braking force to front-left, front-right, rear-left, and rear-right vehicle wheels.

Also, various types of safety devices may be provided in the vehicle for safety of a driver and a passenger.

Safety devices in the vehicle may include various types of safety devices such as an airbag control device configured to ensure safety of a passenger such as a driver when a vehicle collision occurs and a vehicle electronic stability control (ESC) device configured to control an orientation of the vehicle when the vehicle accelerates or corners.

The vehicle 1 includes an electronic control unit (ECU) configured to control operations of the actuating device, the various types of safety devices, and various types of detection devices.

Also, the vehicle 1 may further include a hands-free device installed for a convenience of a driver, and an electronic device such as a global positioning system (GPS) receiver, an audio device, a Bluetooth device, and a high-pass device.

The vehicle 1 may further include a start button configured to input an operation command to a starting motor.

The vehicle 1 operates the starting motor when the start button is pressed, and an engine, which is a power generation device, is operated by the operation of the starting motor.

The vehicle 1 further includes a battery electrically connected to a terminal, an audio device, an indoor light, the starting motor, and other electronic devices to supply driving power thereto.

The battery is charged using a self-power generator or power of the engine while driving.

Figure 3:
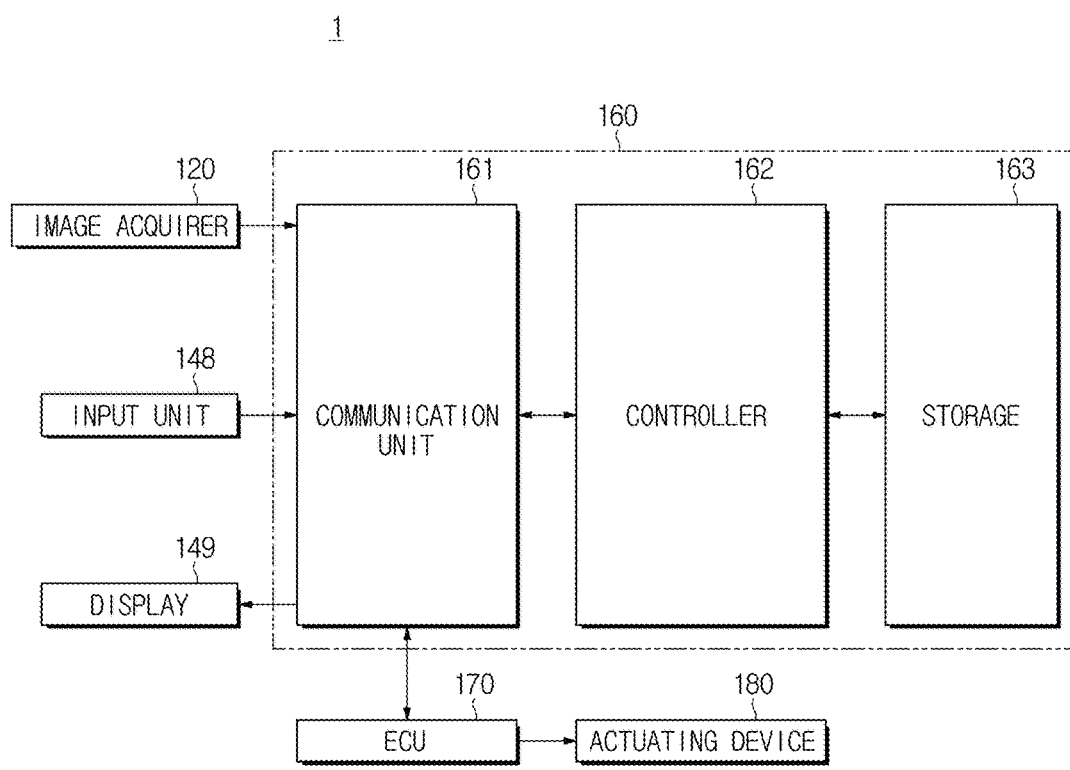
FIG. 3 is a control block diagram of the vehicle according to an embodiment.

FIG. 3 is a control block diagram of the vehicle according to an embodiment. The vehicle 1 includes the image acquirer 120, the input unit 148, the display 149, an autonomous driving control apparatus 160, an ECU 170, and an actuating device 180.

The image acquirer 120 acquires an image of a road and a surrounding of the road in an autonomous driving mode in real time and transmits image information acquired in real time to the autonomous driving control apparatus 160 in the order in which images are acquired.

The input unit 148 receives any one of a manual driving mode in which a driver directly drives the vehicle and the autonomous driving mode in which the vehicle automatically drives itself and transmits a signal of a command corresponding to an input mode to the autonomous driving control apparatus 160.

The input unit 148 may receive information on a destination, receive a selection between driving on an expressway and driving on a national highway, and may receive a driving speed in the autonomous driving mode.

The display 149 displays a driving mode and a driving speed of the vehicle.

Further, the vehicle may receive the information on a destination through the vehicle terminal 150, display an image of a road, route guidance information, and map information, and an image of a surrounding through the vehicle terminal.

The image acquirer 120, the input unit 148, and the display 149 may transmit and receive information to and from the autonomous driving control apparatus 160 through communications.

The autonomous driving control apparatus 160 controls driving of the vehicle based on information of a road and an object during the autonomous driving mode and includes a communication unit 161, a controller 162, and a storage 163.

The communication unit 161 performs communication between the image acquirer 120, the input unit 148, the display 149, and the controller 162 of the autonomous driving control apparatus 160.

That is, the communication unit 161 transmits an image acquisition command of the controller 162 of the autonomous driving control apparatus 160 to the image acquirer 120 and transmits image information acquired by the image acquirer 120 to the controller 162.

Also, the communication unit 161 transmits an autonomous driving command input to the input unit 148 to the controller 162 and transmits information related to the autonomous driving mode to the display 149 based on the command from the controller 162.

Also, the communication unit 161 performs communications with the ECU 170 and transmits driving control information, braking control information, and steering control information for autonomous driving to the ECU 170 based on the command from the controller 162.

When the autonomous driving command is received, the controller 162 transmits an activation command to the image acquirer 120 so that images of a road and a surrounding of the road are acquired by the image acquirer 120.

When the images acquired by the image acquirer 120 are received, the controller 162 uses the received images to perform deep-learning.

The images acquired by the image acquirer 120 may be received periodically or in real time.

The controller 162 selects two or more consecutive images among the received images, uses information on the two or more selected images to perform deep-learning, detects a moving object by performing the deep-learning, and recognizes a change in position of the vehicle itself based on information on the detected moving object.

A configuration of the controller using deep-learning to recognize a change in position of the vehicle itself will be described in more detail.

Further, an image acquired before a current time point will be referred to as a first image, and an image acquired at the current time point will be referred to as a second image for convenience of description. That is, the second image is an image acquired at a time point at which a certain amount of time has elapsed from a time point at which the first image is acquired.

The controller 162 checks one or more pieces of information of distinguishing line information, distinguishing color distribution information, and distinguishing pixel information based on pixel information of the first image among pieces of information on the first image and compares the one or more pieces of checked information with data stored in the storage 163 to search for information similar to the one or more pieces of checked information among the data stored in the storage 163.

Here, the similar information may be information having a predetermined degree or higher of similarity with the checked information among the data stored in the storage 163.

Also, the checking of the distinguishing line information, the distinguishing color distribution information, and the distinguishing pixel information includes checking a pattern of lines or color distribution in the first image.

Further, the controller 162 may also check surface information, shape information, and size information based on the pixel information of the first image.

That is, the controller 162 uses deep-learning to detect a moving object from each of the first image and the second image, checks an area of each of the first image and the second image to which the detected moving object belongs, detects a moving object in a surrounding area of the checked area in each of the first image and the second image, removes the detected moving objects from the first image and the second image to leave only fixed objects in each of the images, and compares positions of the fixed objects in the first image and the second image to recognize a change in position of the vehicle itself. In more detail, the controller 162 extracts features points from a detection area in which a moving object is detected and a surrounding area of the detection area in which the moving object is detected from areas of the first image and the second image, filters the detection area and the surrounding area to determine representative feature points, and uses feature points, except the determined representative feature points, among the feature points in the first image and the second image to recognize a position of the vehicle itself.

Here, there may be a single representative feature point or a plurality of representative feature points.

The feature points, except the determined representative feature points, among the feature points in the first image and the second image may be feature points of a fixed object.

Further, the controller 162 excludes representative feature points that are present in both of the surrounding areas of the first image and the second image among the feature points in the first image and the second image for recognizing the position of the vehicle itself from the feature points of the fixed object.

Also, the controller 162 may use deep-learning to detect a fixed object and a moving object in each of the first image and the second image, detect a moving object in a boundary area between the fixed object and the moving object, remove moving objects detected in the first image and the second image to leave only fixed objects in each of the images, and compare positions of the fixed objects in the first image and the second image to recognize a change in position of the vehicle itself.

Further, the controller 162 may use visual odometry calculation, simultaneous localization and mapping (SLAM), or structure from motion (SFM) to detect a fixed object and may use deep-learning to detect a moving object.

Hereinafter, a configuration of the controller will be described when a fixed object and a moving object are detected.

The controller 162 detects a fixed object and a moving object in the first image based on found information and extracts feature points from an area of the first image from which the fixed object and the moving object are detected.

The controller 162 detects a fixed object and a moving object in the second image and extracts feature points from an area of the second image from which the fixed object and the moving object are detected.

A method used here is the same as that of detecting a fixed object and a moving object in the first image and extracting feature points therefrom.

Further, the controller 162 may also extract feature points while performing deep-learning.

The controller 162 compares positions of feature points in an area of the first image in which a fixed object is detected with positions of feature points in an area of the second image in which the fixed object is detected to recognize a change in position of the fixed object and recognize a change in position of the vehicle itself based on the recognized change in position of the fixed object.

Here, there may be a plurality of feature points in the area in which the feature point is detected.

The controller 162 divides the area of each of the first image and the second image into an area in which a fixed object is detected (i.e., a first area), an area in which a moving object is detected (i.e., a second area), and a third area which is a boundary between the first area and the second area, and extracts feature points from the first, second, and third areas of the first image and the second image.

The controller 162 checks feature values of the feature points in the first and third areas of the first image and the second image, multiplies the checked feature values by a filter coefficient for each area to determine representative feature points of the fixed object, checks feature values of feature points in the second and third areas of the first image and the second image, and multiplies the checked feature values by the filter coefficient for each area to determine representative feature points of the moving object.

Here, there may be a single representative feature point or a plurality of representative feature points.

The controller 162 compares representative feature points of the fixed object in the first image with representative feature points of the fixed object in the second image to determine valid feature points of the fixed object, and compares representative feature points of the moving object in the first image with representative feature points of the moving object in the second image to determine valid feature points of the moving object.

The controller 162 compares feature values of the valid feature points of the fixed object with feature values of the valid feature points of the moving object to determine whether matching feature values are present and, when matching feature values are present, changes the valid feature points that have the matching feature value among the valid feature points of the fixed object to invalid feature values.

Here, the mutually matching feature values may be feature values equal to each other on the basis of brightness constancy assumption (BCA*).

Further, the mutually matching feature values may include feature values having a difference within a predetermined value.

The controller 162 recognizes a change in position of the fixed object based on positions of the valid feature points of the fixed object in the first image and the second image and recognizes a change in position of the moving object based on positions of the valid feature points of the moving object in the first image and the second image.

The controller 162 recognizes a change in distance and a change in direction between the vehicle itself and the moving object based on the recognized change in position of the moving object and the recognized change in position of the fixed object and controls driving of the vehicle itself based on the recognized changes in distance and direction.

Here, the change in position of the vehicle itself refers to information on movement of the vehicle itself.

Further, the controller 162 may divide the area of each of the first image and the second image into the area in which a fixed object is detected (i.e., the first area), the area in which a moving object is detected (i.e., the second area), and the third area which is the boundary between the first area and the second area, extract feature points of the fixed object from the third area of each of the first image and the second image, and use the feature points extracted from the third area of the first image and the third area of the second image as feature points for recognizing a change in position of the vehicle itself.

That is, the controller 162 compares positions of the feature points in the third area of the first image with positions of the feature points in the third area of the second image to recognize changes in the positions of the feature points of the fixed object in the third area, and recognizes a change in position of the vehicle itself based on the recognized changes in positions of the feature points in the third area and the recognized changes in positions of the feature points in the first area.

The controller 162 may extract feature points of the moving object among the feature points in the third area of the first image, extract feature points of the moving object among the feature points in the third area of the second image, extract feature points in the second area of the first image and feature points in the second area of the second image, and compare positions of the extracted feature points of the moving object in the first image with positions of the extracted feature points of the moving object in the second image to recognize a change in position of the moving object.

The controller 162 uses pieces of image information received in real time to recognize a change in position of the vehicle itself in real time and control avoidance driving for avoiding an object.

The controller 162 may store line information, pixel information, and color distribution information of the fixed object and line information, pixel information, and color distribution information of the moving object in the image corresponding to a deep-learning performance result in the storage 163 and update data in the storage 163.

Here, the controller 162 stores the line information, the pixel information, and the color distribution information of the objects in a group in which similar information is stored.

For example, the line information, the pixel information, and the color distribution information of the fixed object are stored in a group in which information on the fixed object is stored among groups in the storage, and the line information, the pixel information, and the color distribution information of the moving object are stored in a group in which information on the moving object is stored among the groups in the storage.

The storage 163 stores a plurality of pieces of data.

Here, the plurality of pieces of data include data related to a road and objects that may be present near the road.

Here, the objects are objects that may become an obstacle in driving the vehicle itself and may include a fixed object whose position is fixed and a moving object whose position is movable.

Data related the objects may include one or more of image information, text information, voice information, and state information for each of the objects (i.e., objects).

The image information may include line information, color distribution information, and pixel information and may further include surface information, shape information, and size information for each of the objects.

Here, the line information, the color distribution information, the pixel information, the surface information, the shape information, and the size information for each of the objects are unique pieces of information on each of the objects. Each of the pieces of information may appear with the same pattern in the same object. Further, a pattern of each of the pieces of information may be distinguishing information for each of the objects.

Information on a state of an object includes a fixed state in which a position thereof is fixed and a moving state in which the position thereof is movable.

Pieces of information having a similar pattern may be differentiated and stored in the storage 163.

For example, pieces of information having a similar pattern of lines, pieces of information having a similar color distribution pattern, and pieces of information having a similar pattern of lines and a similar color distribution pattern may be differentiated into groups and stored.

In another example, possible patterns of lines and color distribution patterns of moving objects and possible patterns of lines and color distribution patterns of fixed objects may be stored in the storage 163.

The storage 163 may have a plurality of storage areas, and the plurality of storage areas may be storages differentiated into groups.

Also, a plurality of storages 163 may be provided so that a plurality of groups of information are stored therein by group.

Data in the storage may include an object name input by a user and image information corresponding thereto, an object name transmitted from an external server and image information corresponding thereto, pieces of image information on objects transmitted from the server, distinguishing information, and information on the fixed state or the moving state.

Also, the data in the storage may include pieces of information on images acquired during a certain period of time, pieces of distinguishing information on objects detected by deep-learning performed on the images acquired during the certain period of time, and pieces of information on the fixed state or the moving state of the objects.

Here, image information may include a time at which an image is acquired, a name of the image, pixel information of the image, and the like.

The distinguishing information may include distinguishing line information, distinguishing pixel information, distinguishing color distribution information, distinguishing surface information, distinguishing shape information, and distinguishing size information.

The data in the storage may further include information on an image generated by deep-learning during the autonomous driving mode of the vehicle and information on objects.

That is, the data in the storage may be updated.

The ECU 170 controls operation of the actuating device 180 based on driving control information transmitted from the autonomous driving control apparatus 160.

Here, a single ECU 170 may be provided, or a plurality of ECUs 170 may be provided so that the ECUs 170 control a driving device, a braking device, and a steering device, respectively.

The actuating device 180 actuates one or more of the driving device, the braking device, and the steering device based on a control signal of the ECU 170.

Figure 4:
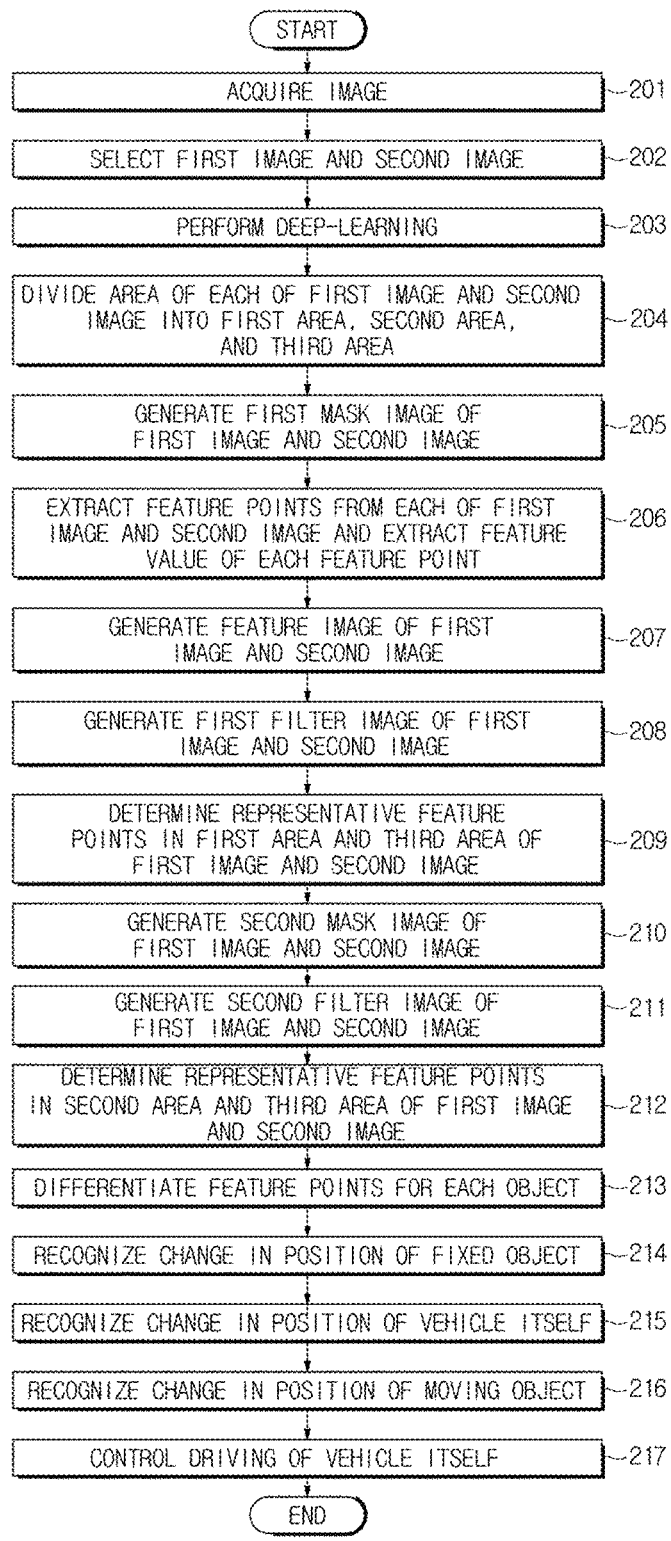
FIG. 4 is a control flowchart of the vehicle according to an embodiment.

FIG. 4 is a control flowchart of the vehicle according to an embodiment and will be described with reference to FIGS. 5 to 23.

The vehicle uses deep-learning to detect a moving object from each of the first image and the second image, checks an area of each of the first image and the second image to which the detected moving object belongs, detects a moving object in a surrounding area of the checked area in each of the first image and the second image, removes the detected moving object from the first image and the second image to leave only a fixed object in each of the images, and compares positions of the fixed object in the first image and the second image to recognize a change in position of the vehicle itself.

The vehicle may use deep-learning, visual odometry calculation, SLAM, or SFM to detect the fixed object.

In other words, in this embodiment, a case in which both a fixed object and a moving object are detected and properties of feature points in a surrounding area of a detection area at which the moving object is detected are differentiated will be described.

Here, differentiating properties of the feature points in the surrounding area includes differentiating whether the feature points are related to the moving object or are related to the fixed object.

Figure 5:
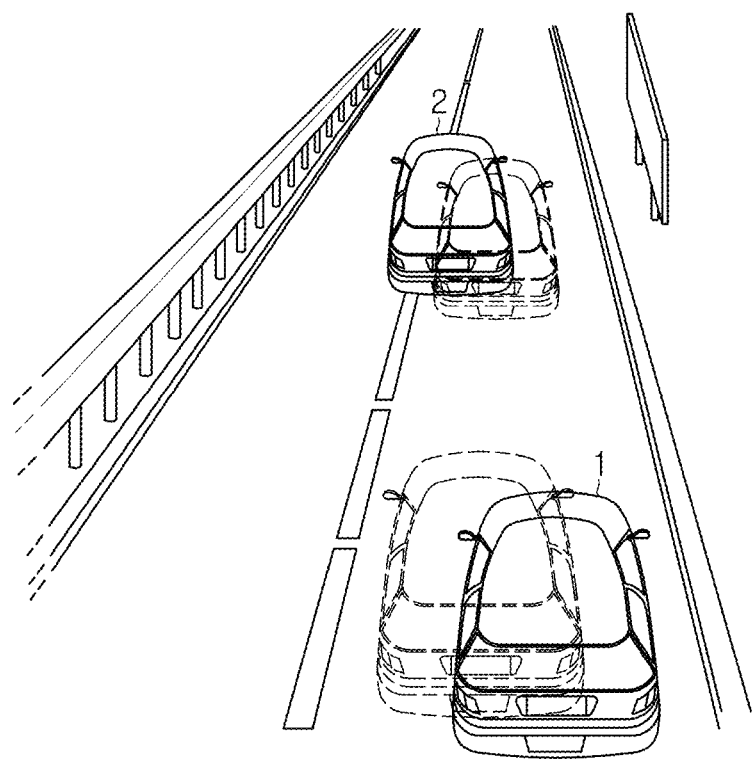
FIG. 5 illustrates driving the vehicle according to an embodiment.
Figure 6A:
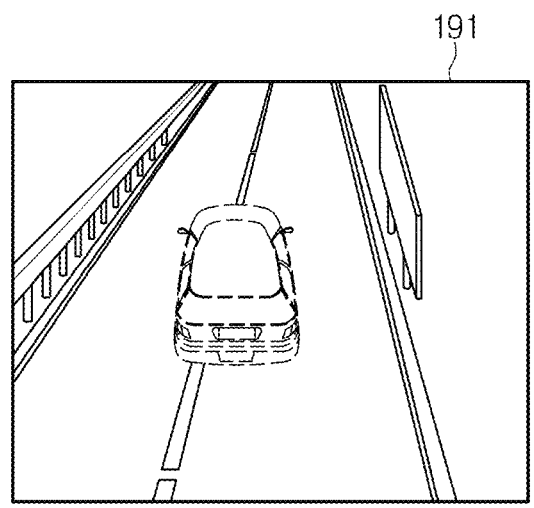
FIGS. 6A and 6B illustrate a first image and a second image of an autonomous driving control apparatus provided in the vehicle according to an embodiment.
Figure 6B:
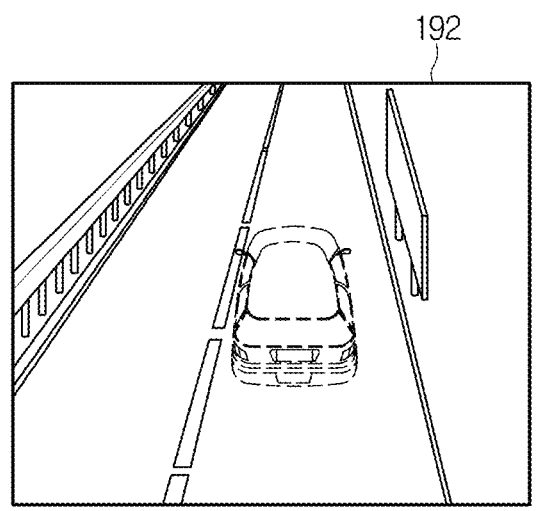

Here, FIG. 5 illustrates driving the vehicle according to an embodiment, and FIGS. 6A and 6B are exemplary views of a first image and a second image of an autonomous driving control apparatus provided in the vehicle according to an embodiment.

Also, FIGS. 7 to 13 illustrate image processing of the first image of the autonomous driving control apparatus provided in the vehicle according to an embodiment, and is a view for describing extracting feature points for recognizing an object in the first image and determining representative feature points.

FIGS. 14 to 21 illustrate image processing the second image of the autonomous driving control apparatus provided in the vehicle according to an embodiment, and is a view for describing extracting feature points for recognizing an object in the second image and determining representative feature points FIGS. 22A, 22B, 23A, 23B, 24A, 24B, 25, 26A, 26B, 26C, and 26D illustrate determining valid feature points in the first image and the second image and recognizing positions of a fixed object and a moving object.

When an autonomous driving command is input through the input unit 148, the vehicle activates the image acquirer 120 and acquires images of a road and a surrounding thereof (201).

As illustrated in FIG. 5, the vehicle 1 may acquire the images of the road in front of the vehicle itself, the surrounding of the road, and another vehicle 2 in real time.

Corresponding to a change in position of the vehicle itself, the vehicle may acquire an image of the same object at a different position or an image of a different object.

That is, in an image acquired after a position of the vehicle itself is changed, a position of the same object may be different or a different object may be shown compared to an image acquired before the position of the vehicle itself is changed.

Further, a change in position of a moving object, from the image acquired before the position of the vehicle itself is changed to the image acquired after the position of the vehicle itself is changed, depends on a moving speed and a moving direction of the moving object, and may be different from a change in position of a fixed object.

That is, the vehicle compares a plurality of pieces of image information acquired in real time to recognize a change in position of the vehicle itself.

As illustrated in FIGS. 6A and 6B, the vehicle selects a first image (frame) 191 acquired before a current time point and a second image (frame) 192 acquired at the current time point among a plurality of images acquired in real time (202).

Then, the vehicle uses the selected first image and second image to perform deep-learning and detect an object from the images (203).

More specifically, the vehicle checks line information, pixel information, and color distribution information based on pixel information of the first image among pieces of information on the first image and searches for similar information that is similar to the checked line information, pixel information, and color distribution information in data stored in the storage 163.

Here, the checking of the line information, the pixel information, and the color distribution information includes checking a pattern of lines and a color distribution pattern.

Further, the vehicle may also check surface information, shape information, and size information based on the pixel information of the first image and search for similar information that is similar to the checked surface information, shape information, and size information in the data in the storage 163.

Also, the searching for similar information that is similar to the checked line information, pixel information, and color distribution information includes searching for a pattern of lines having a predetermined or higher similarity with a checked pattern of lines, searching for a pixel pattern having predetermined or higher similarity with a checked pixel pattern, searching for a color distribution pattern having a predetermined degree or higher similarity with a checked color distribution pattern, and searching for an object having the found pattern of lines, pixel pattern, and color distribution pattern, from data in the storage 163.

Then, the vehicle determines a moving object based on the found similar information. Further, the vehicle may determine a fixed object based on the found similar information.

Here, the found similar information includes information on an object having the pattern of lines, the pixel pattern, and the color distribution pattern found from the data in the storage 163.

Information on an object may include a name of the object and information on whether the object is fixed or moving.

Then, the vehicle divides an area of the first image into a first area which is an area in which a fixed object is detected, a second area which is an area in which a moving object is detected, and a third area which is a boundary between the first area and the second area (204).

Here, the third area may be an area from a perimeter of the second area to a line extended a predetermined length therefrom toward the first area.

Figure 7:
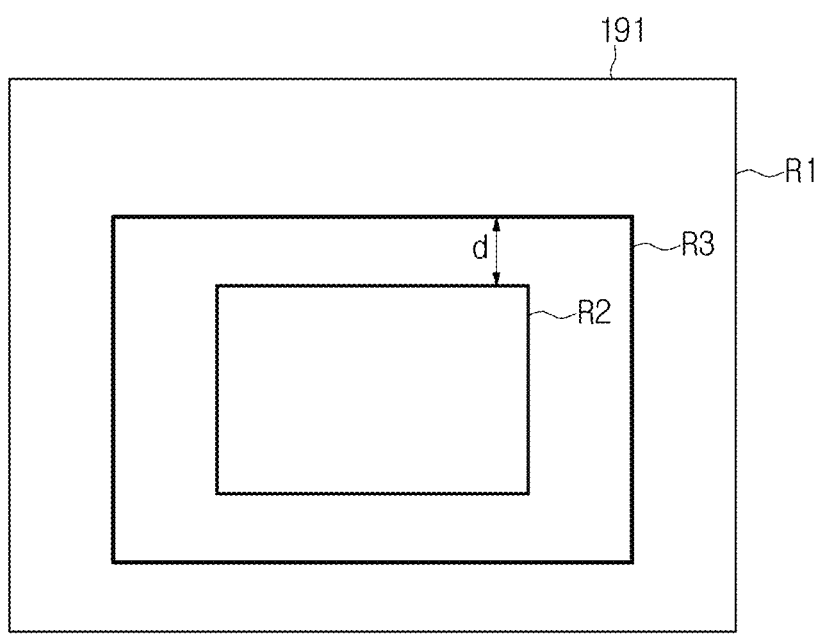

As illustrated in FIG. 7, the area of the first image is divided into a first area R1 and a second area R2, and a part of the first area R1 that is the area from the perimeter of the second area R2 to the line extended a predetermined length d therefrom toward the first area R1 is differentiated as a third area R3.

Then, the vehicle generates a filter coefficient at each pixel of the first area, the second area, and the third area of the first image to generate a first mask image (205).

Here, a filter coefficient reflected in the first area may be 1, a filter coefficient reflected in the second area may be 0.5, and a filter coefficient reflected in the third area may be 0.

As illustrated in FIG. 8, the vehicle generates the filter coefficient of 1 in the first area R1 of the first image, generates the filter coefficient of 0.5 in the second area R2 of the first image, and generates the filter coefficient of 0 in the third area R3 of the first image to generate a first mask image 191a.

Then, the vehicle extracts feature points from each of the first area, the second area, and the third area of the first image and extracts a feature value of each of the feature points (206).

Here, the feature point may also be extracted when deep-learning is performed.

The vehicle extracts feature values of feature points of a fixed object and a moving object in the first image and generates a feature image 191b in which the extracted feature values are reflected (207).

Here, the extraction of the feature value may use any one method of extracting and calculating a feature among Features from Accelerated Segment Test (FAST), Scale Invariant Feature Transform (SIFT), Histogram of Oriented Gradient (HOG), Speeded-Up Robust Features (SURF), Based Real-Time Feature Matching Algorithms (BRIEF), Oriented FAST and Rotated BRIEF (ORB), Fast Retina Keypoint (FREAK), Binary Robust Invariant Scalable Keypoints (BRISK), Principle Component Analysis SIFT (PCA-SIFT), and Gradient Location and Orientation Histogram (GLOH).

Moreover, various types of feature extraction and calculation methods used in extracting a feature value may be used.

Further, the vehicle may extract feature values for all pixels of the first image.

As illustrated in FIG. 9, the vehicle extracts features values for all pixels of the first image and generates the feature image 191b having the feature values.

As illustrated in FIG. 10, the vehicle matches a filter coefficient in the first mask image with a feature value in the feature image for each pixel at the same position, multiplies the filter coefficient by a matching feature value for each pixel to generate a new feature value, and generates a first filter image 191c in which the new feature values are reflected (208).

Here, a feature value in the third area where the filter coefficient is 0.5 may be changed to a value that is ½ of an initial feature value thereof, and a feature value in the second area where the filter coefficient is 0 may be changed to 0.

Figure 11:
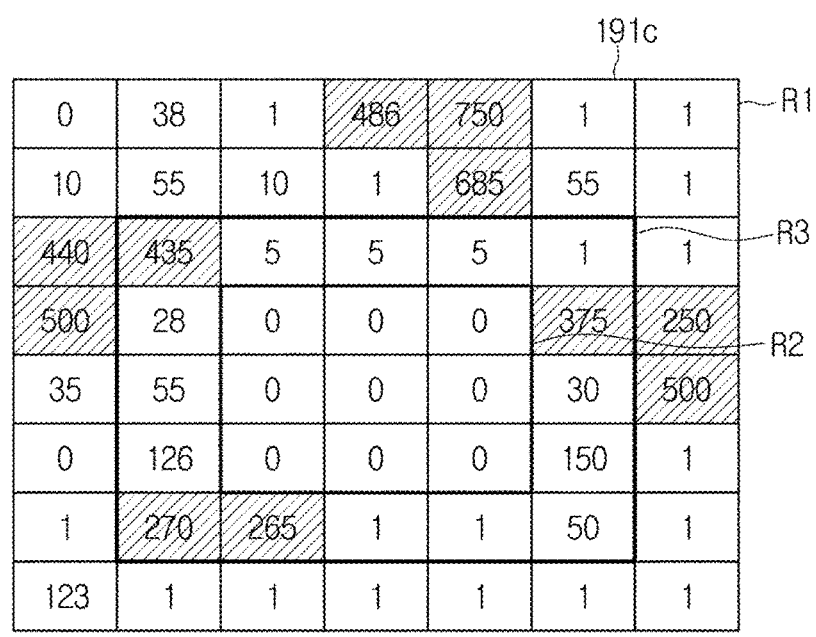

As illustrated in FIG. 11, the vehicle checks whether there are pixels having a feature value equal to or greater than a first predetermined feature value among pixels of the first filter image 191c, determines the found pixels as representative feature points (209), and stores positions (i.e., pixel positions) of the determined representative feature points.

Here, feature points in the first area of the first image may be feature points related to a fixed object, and feature points in the third area may be feature points of a fixed object or a moving object.

Further, the checking of whether there are pixels having a feature value equal to or greater than the first predetermined feature value among the pixels of the first image is referred to as an ego-motion pass filter of the vehicle itself.

Figure 22A:
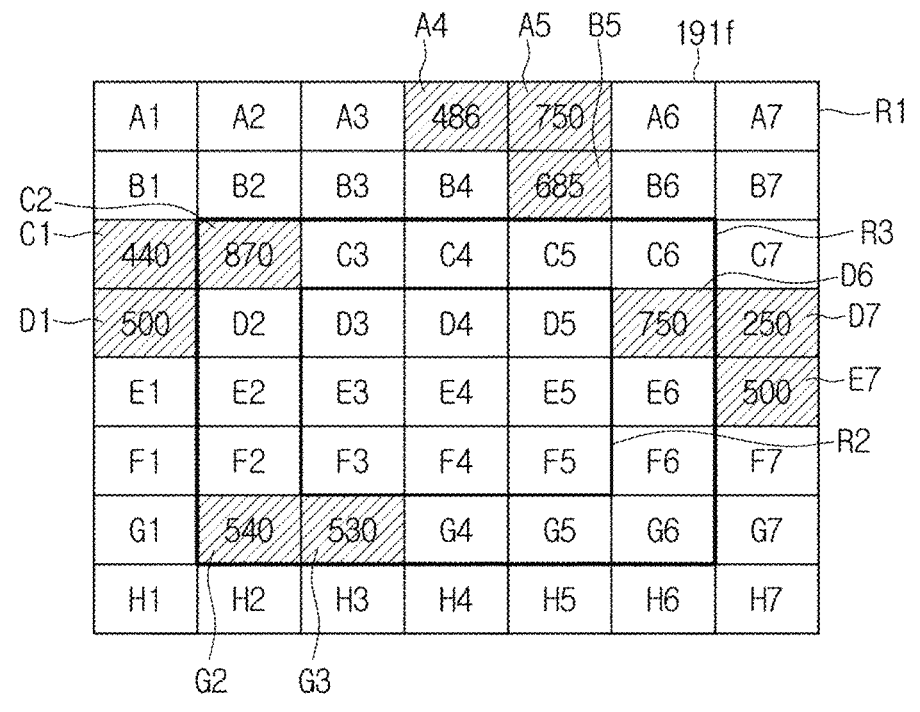

The vehicle may generate a first matching image in which the positions (i.e., the pixel positions) of the determined representative feature points among the representative feature points in the first area and the third area of the first image are stored (see FIG. 22A).

Here, the feature values of the representative feature points of the first matching image of the first image may be stored as original values to facilitate comparison between the images.

Then, the vehicle generates a filter coefficient at each pixel of the first area, the second area, and the third area of the first image to generate a second mask image through the image acquirer 120 (210).

Here, the filter coefficient reflected in the first area may be 0, the filter coefficient reflected in the second area may be 1, and the filter coefficient reflected in the third area may be 0.5.

As illustrated in FIG. 12, the vehicle generates the filter coefficient of 0 in the first area R1 of the first image, generates the filter coefficient of 1 in the second area R2 of the first image, and generates the filter coefficient of 0.5 in the third area R3 of the first image to generate a second mask image 191*d*.

Then, the vehicle matches a filter coefficient in the second mask image 191*d* with a feature value in the feature image 191*b* for each pixel at the same position, multiplies the filter coefficient by a matching feature value for each pixel to generate a new feature value, and generates a second filter image 191*e* in which the new feature values are reflected (211).

Here, a feature value in the third area where the filter coefficient is 0.5 may be changed to a value that is ½ of an initial feature value thereof, and a feature value in the first area where the filter coefficient is 0 may be changed to 0.

As illustrated in FIG. 13, the vehicle checks whether there are pixels having a feature value equal to or greater than a second predetermined feature value among the pixels of the second filter image 191*e*, determines the found pixels as representative feature points (212), and stores positions (i.e., pixel positions) of the determined representative feature points.

Here, the second predetermined feature value may be equal to or greater than the first predetermined feature value.

Here, feature points in the second area of the first image may be feature points related to a moving object, and feature points in the third area may be feature points of a fixed object or a moving object.

Further, the checking of whether there are pixels having a feature value equal to or greater than the second predetermined feature value among the pixels of the first image is referred to as an ego-motion stop filter of the vehicle itself.

The vehicle may generate a second matching image in which the positions (i.e., the pixel positions) of the determined representative feature points among the representative feature points in the second area and the third area of the first image are stored (see FIG. 24A).

Here, the feature values of the representative feature points of the second matching image of the first image may be stored as original values to facilitate comparison between the images.

The vehicle determines feature points in the second image 192 acquired at the current time point by differentiating the feature points into feature points of a moving object and feature points of a fixed object.

This may be performed in the same way as in the above case of the first image 191.

This will be briefly described with reference to FIGS. 14 to 21.

The vehicle checks line information, pixel information, and color distribution information based on pixel information of the second image among pieces of information on the second image and searches for similar information that is similar to the checked line information, pixel information, and color distribution information from data stored in the storage 163.

Then, the vehicle determines whether a detected object is fixed or moving on the basis of on the found similar information.

Figure 14:
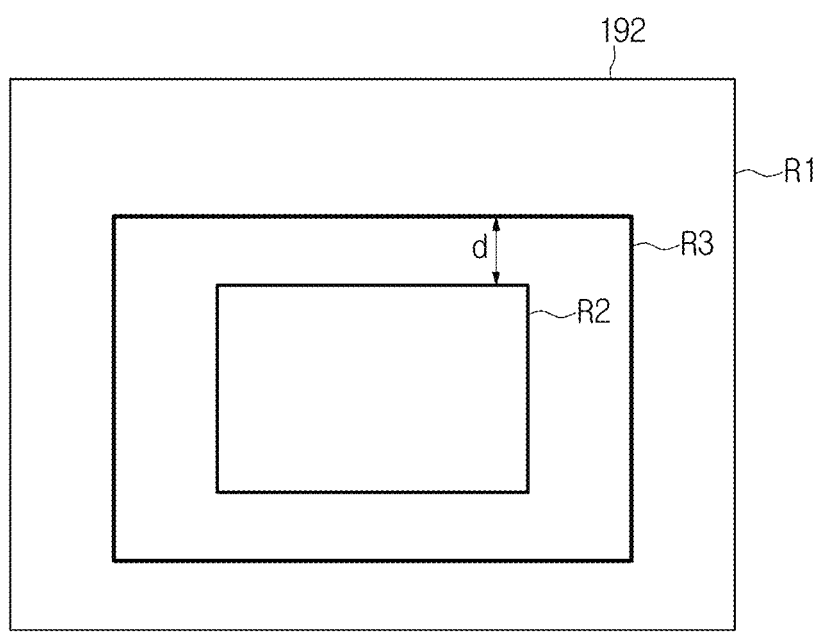

As illustrated in FIG. 14, the area of the second image is divided into a first area R1 which is an area in which a fixed object is detected, a second area R2 in which a moving object is detected, and a third area R3 which is a boundary between the first area and the second area.

Here, the third area R3 may be an area from a perimeter of the second area R2 to a line extended the predetermined length d therefrom toward the first area.

As illustrated in FIG. 15, the vehicle generates a filter coefficient at each pixel of the first area R1, the second area R2, and the third area R3 of the second image to generate a first mask image 192*a*.

Here, a filter coefficient reflected in the first area R1 may be 1, a filter coefficient reflected in the second area may be 0, and a filter coefficient reflected in the third area may be 0.5.

As illustrated in FIG. 16, the vehicle extracts feature points from each of the first area R1, the second area R2, and the third area R3 of the second image and extracts a feature value of each of the feature points to generate a feature image 192*b* in which the feature values are reflected.

Figure 17:
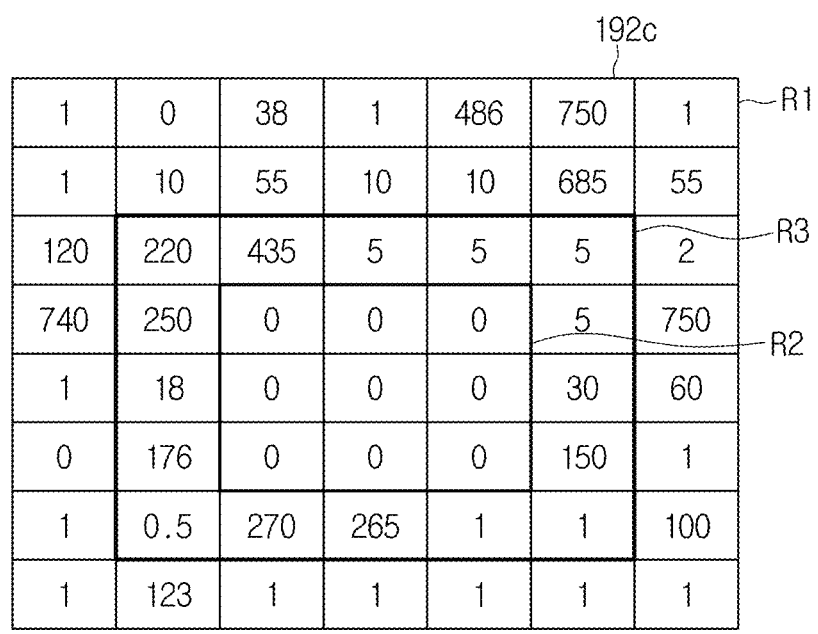

As illustrated in FIG. 17, the vehicle matches the filter coefficients in the first mask image 192*a* of the second image with a feature value in the feature image 192*b* for each pixel at the same position, multiplies the filter coefficient by a matching feature value for each pixel to generate a new feature value, and generates a first filter image 192*c* in which the new feature values are reflected (208).

Here, a feature value in the third area where the filter coefficient is 0.5 may be changed to a value that is ½ of an initial feature value thereof, and a feature value in the second area where the filter coefficient is 0 may be changed to 0.

As illustrated in FIG. 18, the vehicle checks whether there are pixels having a feature value equal to or greater than the first predetermined feature value among the pixels of the first filter image 192*c*, determines the found pixels as representative feature points, and stores positions (i.e., pixel positions) of the determined representative feature points.

Here, feature points in the first area of the second image may be feature points related to a fixed object, and feature points in the third area may be feature points of a fixed object or a moving object.

Further, the checking of whether pixels having a feature value equal to or greater than the first predetermined feature value among the pixels of the second image is referred to as an ego-motion pass filter of the vehicle itself.

Figure 22B:
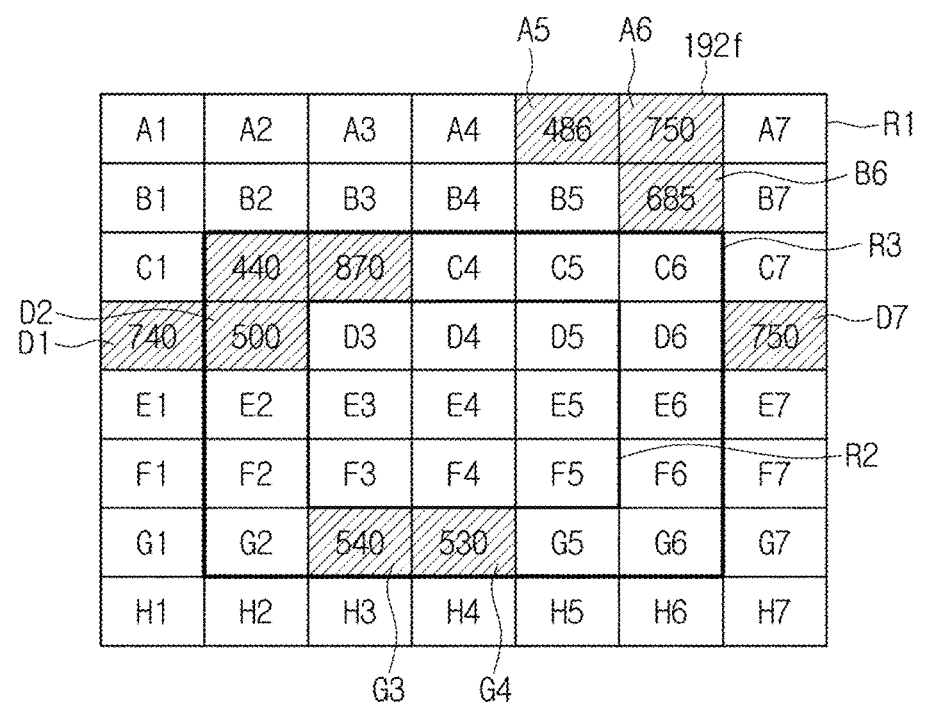

The vehicle may generate a first matching image in which the positions (i.e., the pixel positions) of the determined representative feature points among the representative feature points in the first area and the third area of the second image are stored (see FIG. 22B).

Here, the feature values of the representative feature points of the first matching image of the second image may be stored as original values to facilitate comparison between the images.

As illustrated in FIG. 19, the vehicle generates a filter coefficient at each pixel of the first area R1, the second area R2, and the third area R3 of the second image to generate a second mask image 192*d*.

Here, the filter coefficient reflected in the first area may be 0, the filter coefficient reflected in the second area may be 1, and the filter coefficient reflected in the third area may be 0.5.

As illustrated in FIG. 20, the vehicle matches a filter coefficient in the second mask image 192d of the second image with a feature value in the feature image 192b for each pixel at the same position, multiplies the filter coefficient by a matching feature value for each pixel to generate a new feature value, and generates a second filter image 192e in which the new feature values are reflected.

Here, a feature value in the third area where the filter coefficient is 0.5 may be changed to a value that is ½ of an initial feature value thereof, and a feature value in the first area where the filter coefficient is 0 may be changed to 0.

As illustrated in FIG. 21, the vehicle checks whether there are pixels having a feature value equal to or greater than a second predetermined feature value among the pixels of the second filter image 192e of the second image, determines the found pixels as representative feature points, and stores positions (i.e., pixel positions) of the determined representative feature points. Here, the second predetermined feature value may be equal to or greater than the first predetermined feature value.

Here, feature points in the second area of the second image may be feature points related to a moving object, and feature points in the third area may be feature points of a fixed object or a moving object.

Further, the checking of whether there are pixels having a feature value equal to or greater than the second predetermined feature value among the pixels of the second image is referred to as an ego-motion stop filter of the vehicle itself.

The vehicle may generate a second matching image in which the positions (i.e., the pixel positions) of the determined representative feature points among the representative feature points in the second area and the third area of the second image are stored (see FIG. 24B).

Here, the feature values of the representative feature points of the second matching image of the second image may be stored as original values to facilitate comparison between the images.

Then, the vehicle compares a first matching image 191f of the first image with a first matching image 192f of the second image. Here, the vehicle compares feature points in a first area and a third area of the matching images of the first image and the second image and differentiates whether the feature points in the third area of the matching images are feature points of a moving object or feature points of a fixed object (213).

Referring to FIGS. 22A and 22B, the vehicle compares feature values of representative feature points in a first area and a third area of the first matching image 191f of the first image with feature values of representative feature points in a first area and a third area of the first matching image 192f of the second image to check whether there are representative feature points in the first area and the third area of the first matching image 191f of the first image and representative feature points in the first area and the third area of the first matching image 192f of the second image having matching feature values.

Here, the comparison of the feature values of the representative feature points in the first area and the third area of the first matching image 191f of the first image with the feature values of the representative feature points in the first area and the third area of the first matching image 192f of the second image includes performing any one matching feature detection algorithm of block matching, optical flow estimation, and a Kanade-Lucas-Tomasi (KLT) feature tracker.

Moreover, various types of algorithms capable of detecting points that correspond between images may be used.

The vehicle determines the representative feature points in the first area and the third area of the first matching image 191f of the first image and the representative feature points in the first area and the third area of the first matching image 192f of the second image having matching feature values as valid feature points of the fixed object, and determines representative feature points having the remaining feature values in the first matching image of the first image and the first matching image of the second image as invalid feature points.

That is, the vehicle removes representative feature points whose feature values do not match among the representative feature points in the first area and the third area of the first matching image 191f of the first image and the representative feature points in the first area and the third area of the first matching image 192f of the second image from representative feature points of the fixed object.

As illustrated in FIG. 22A, the representative feature points in the first area and the third area of the first matching image 191f of the first image and original feature values of the representative feature points include a feature value of 486 at Pixel A4, a feature value of 750 at Pixel A5, a feature value of 685 at Pixel B5, a feature value of 440 at Pixel C1, a feature value of 870 at Pixel C2, a feature value of 500 at Pixel D1, a feature value of 750 at Pixel D6, a feature value of 250 at Pixel D7, a feature value of 500 at Pixel E7, a feature value of 540 at Pixel G2, and a feature value of 530 at Pixel G3.

Also, as illustrated in FIG. 22B, the representative feature points in the first area and the third area of the first matching image 192f of the second image and original feature values of the representative feature points include a feature value of 486 at Pixel A5, a feature value of 750 at Pixel A6, a feature value of 685 at Pixel B6, a feature value 440 at Pixel C2, a feature value of 870 at Pixel C3, a feature value of 740 at Pixel D1, a feature value of 500 at Pixel D2, a feature value of 750 at Pixel D7, a feature value of 540 at Pixel G3, and a feature value of 530 at Pixel G4.

The vehicle checks the representative feature points in the first area and the third area of the first matching image 192f of the second image that have matching feature values with the feature values 486, 750, 685, 440, 870, 500, 750, 250, 500, 540, and 530 of the respective Pixels A4, A5, B5, C1, C2, D1, D6, D7, E7, G2, and G3, which are representative feature points in the first area and the third area of the first matching image 191f of the first image, and the feature values thereof.

Here, the checked feature values of the representative feature points in the first area and the third area of the first matching image 192f of the second image are the feature values 486, 750, 685, 440, 870, 500, 750, 250, 500, 540, and 530.

That is, matching feature values between the feature values of the representative feature points in the first area and the third area of the first matching image 191f of the first image and the feature values of the representative feature points in the first area and the third area of the first matching image 192f of the second image are 486, 750, 685, 440, 870, 500, 750, 250, 500, 540, and 530, and the representative feature points having the above feature values are determined to be valid feature points of the fixed object.

Figure 23B:
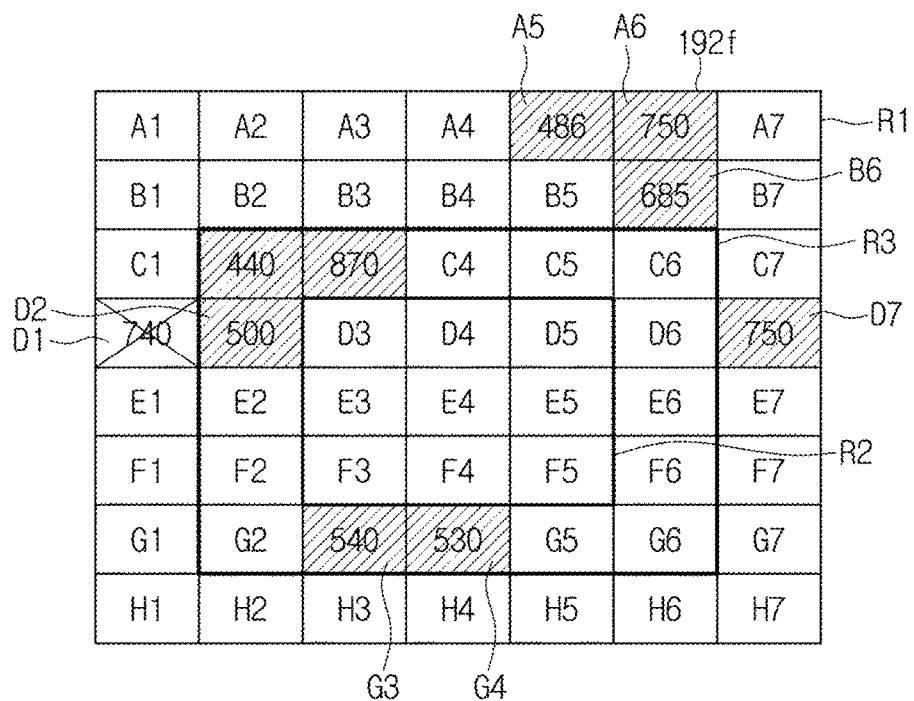

The vehicle determines that the feature points having the feature values of 250 and 500 among the representative feature points in the first area of the first matching image 191*f* of the first image are invalid feature points of the fixed object as illustrated in FIG. 23A, and determines that the feature point having the feature value of 740 among the representative feature points in the first area of the first matching image 192*f* of the second image are invalid feature points of the fixed object as illustrated in FIG. 23B.

Then, the vehicle compares feature values of representative feature points in a second area and a third area of a second matching image 191*g* of the first image with feature values of representative feature points in a second area and a third area of a second matching image 192*g* of the second image to check whether there are representative feature points in the second area and the third area of the second matching image 191*g* of the first image and representative feature points in the second area and the third area of the second matching image 192*g* of the second image having matching feature values (see FIGS. 24A and 24B).

Here, the comparing of the feature values of the representative feature points in the second area and the third area of the second matching image 191*g* of the first image with the feature values of the representative feature points in the second area and the third area of the second matching image 192*g* of the second image includes performing any one matching feature detection algorithm of block matching, optical flow estimation, and a KLT feature tracker.

The vehicle determines that the representative feature points in the second area and the third area of the second matching image 191*g* of the first image and the representative feature points in the second area and the third area of the second matching image 192*g* of the second image having matching feature values are valid feature points of the moving object, and determines that the representative feature points having the remaining feature values in the second matching image 191*g* of the first image and the second matching image 192*g* of the second image are invalid feature points.

That is, the vehicle removes representative feature points whose feature values do not match among the representative feature points in the second area and the third area of the second matching image 191*g* of the first image and the representative feature points in the second area and the third area of the second matching image 192*g* of the second image from representative feature points of the moving object.

As illustrated in FIG. 24A, the representative feature points in the second area and the third area of the second matching image 191*g* of the first image and original feature values of the representative feature points include a feature value of 870 at Pixel C2, a feature value of 720 at Pixel D3, a feature value of 750 at Pixel D6, a feature value of 900 at Pixel E5, and a feature value of 888 at Pixel F5.

Here, the original feature values of the representative feature points are feature values of the representative feature points in an image before the image is multiplied by filter coefficients.

As illustrated in FIG. 24B, the representative feature points in the second area and the third area of the second matching image 192*g* of the second image and the feature values thereof include a feature value of 870 at Pixel C2, a feature value of 750 at Pixel D3, a feature value of 900 at Pixel E2, and a feature value of 888 at Pixel F2.

The vehicle checks the representative feature points in the second area and the third area of the second matching image 192*g* of the second image that have matching feature values with the feature values 870, 720, 750, 900, and 888 of respective Pixels C2, D3, D6, E5, and F5, which are representative feature points in the second area and the third area of the second matching image 191*g* of the first image, and the feature values thereof.

Here, the checked feature values of the representative feature points in the second area and the third area of the second matching image 192*g* of the second image are the feature values 870, 750, 900, and 888.

That is, the matching feature values between the feature values of the representative feature points in the second area and the third area of the second matching image 191*g* of the first image and the feature values of the representative feature points in the second area and the third area of the second matching image 192*g* of the second image are 870, 750, 900, and 888, and the representative feature points having the above feature values are determined to be valid feature points of the moving object.

The vehicle determines that the feature point having the feature value of 720 among the representative feature points in the second area and the third area of the second matching image 191*g* of the first image is an invalid feature point of the moving object as illustrated in FIG. 25.

Further, the vehicle determines that all of the representative feature points in the second area and the third area of the second matching image 192*g* of the second image are valid feature points (same as in FIG. 24B) because the feature values of the representative feature points in the second area and the third area of the second matching image 192*g* of the second image totally match the feature values of the representative feature points in the second area and the third area of the second matching image 191*g* of the first image.

The vehicle compares positions of the valid feature points of the fixed object with positions of the valid feature points of the moving object to determine whether a valid feature point of the moving object that is at the same position as a valid feature point of the fixed object is present. When it is determined that a valid feature point of the moving object placed at the same position as a valid feature point of the fixed object is present, the vehicle changes the determined valid feature point of the fixed object to an invalid feature point.

As described above, when it is unclear as to whether a representative feature point in the third area of the second image that is the same as a representative feature point in the third area of the first image is a valid feature point of a fixed object or a valid feature point of a moving object, the representative feature point is removed from feature points of the fixed object. In this way, accuracy in recognizing a change in position of the vehicle itself that is recognized according to a change in position of a fixed object may be improved.

Removal of an outlier is facilitated because the vehicle only uses a feature point of the fixed object in an image from which the moving object is removed as described above.

Further, a valid feature point of a moving object placed at the same position as a valid feature point of a fixed object may remain as the valid feature point of a moving object.

Referring to FIGS. 23A, 23B, 24A, 24B, it can be seen that the valid feature point having the feature value of 870 among the feature values in the third area of each of the first image and the second image is included in both the valid feature points of the fixed object and the valid feature points of the moving object.

That is, the vehicle changes the valid feature point having the feature value of 870 among the valid feature points of a fixed object to an invalid feature point.

Accordingly, the vehicle may acquire a first valid image 191*h* and a second valid image 191*i* of the first image and a first valid image 192h and a second valid image 192i of the second image as illustrated in FIGS. 26A, 26B, 26C, and 26D.

Then, the vehicle compares the first valid image 191h of the first image with the first valid image 192h of the second image to check positions of valid feature points of a fixed object in each of the first image and the second image, and checks whether the checked positions of the valid feature points of the fixed object in the first image and the checked positions of the valid feature points of the fixed object in the second image are changed to recognize a change in position of the fixed object (214).

Figure 26B:
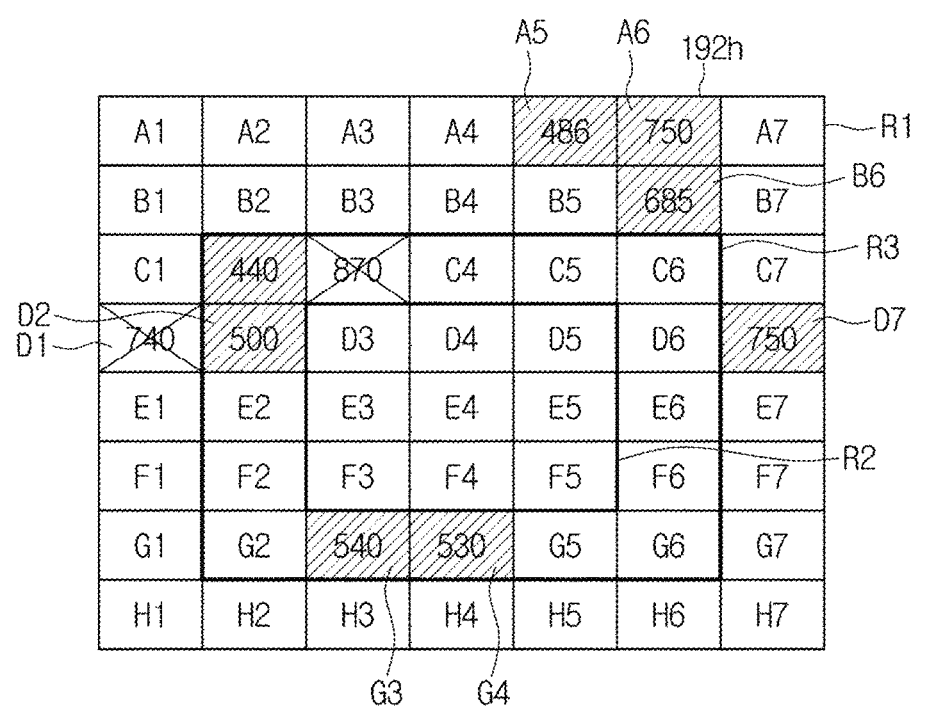

Referring to FIGS. 26A and 26B, positions of valid feature points having feature values of 486, 750, 685, 440, 500, 750, 540, and 530 in the first valid image 191h of the first image are compared with positions of valid feature points having feature values of 486, 750, 685, 440, 500, 750, 540, and 530 in the first valid image 192h of the second image to check whether positions of the feature points having matching feature values are changed so that a change in position of the fixed object may be recognized.

That is, it can be seen that the position of the valid feature point having the feature value of 486 has been changed from Pixel A4 to Pixel A5 from the first image to the second image, the position of the valid feature point having the feature value of 750 has been changed from Pixel A5 to Pixel A6 from the first image to the second image, and the position of the valid feature point having the feature value of 685 has been changed from Pixel B5 to Pixel B6 from the first image to the second image.

All of the valid feature points of the fixed object having matching feature values can be seen to have moved to the right by one pixel.

Then, the vehicle recognizes a change in position of the vehicle itself based on the change in position of the fixed object (215).

That is, when the fixed object in the image is recognized as being moved to the right by one pixel, the vehicle may recognize that the vehicle itself has moved to the left in a direction relative to the fixed object by a distance corresponding to one pixel.

Then, the vehicle compares the second valid image 191i of the first image with the second valid image 192i of the second image to check positions of valid feature points of the moving object in each of the first image and the second image and checks whether the checked positions of the valid feature points of the moving object in the first image and the checked positions of the valid feature points of the moving object in the second image are changed to recognize a change in position of the moving object (216).

Referring to FIGS. 26C and 26D, it can be seen that the position of the valid feature point having the feature value of 750 has been changed from Pixel D6 to Pixel D3 from the first image to the second image, the position of the valid feature point having the feature value of 900 has been changed from Pixel E5 to Pixel E2 from the first image to the second image, and the position of the valid feature point having the feature value of 888 has been changed from Pixel F5 to Pixel F2 from the first image to the second image.

From the above, the moving object can be seen as having moved to the left by two pixels.

The vehicle recognizes a change in distance and a change in direction between the vehicle itself and the moving object based on the change in position of the moving object and the change in position of the fixed object and controls driving of the vehicle itself based on the recognized change in distance and change in direction (217).

Here, the change in position of the vehicle itself refers to information on movement of the vehicle itself.

The vehicle uses pieces of image information received in real time to recognize a change in position of the vehicle itself in real time and drive while avoiding an object.

Further, because the vehicle first detects an object and determines whether the detected object is dangerous based on a change in position of the vehicle itself, the vehicle may perform pre-fill control to prepare for braking for a preemptive action when the object is detected at a time point before driving control is performed to prevent a collision with the object.

Hereinafter, another example of a configuration for differentiating an object in the third area of the first image and the second image will be described.

The vehicle may check whether there are pixels having a feature value equal to or greater than the second predetermined feature value among the pixels in the third area of the second filter image 191e of the first image, determine the found pixels as representative feature points of a moving object, check whether there are pixels having a feature value equal to or greater than the first predetermined feature value and less than the second predetermined feature value among the pixels in the third area of the second filter image 191e of the first image, and determine the found pixels as feature points of a fixed object.

As illustrated in FIG. 27, Pixels C2 and D6 having feature values equal to or greater than the second predetermined feature value among the pixels in the third area of the second filter image 191e of the first image are determined to be representative feature points of the moving object, and pixels G2 and G3 having a feature value equal to or greater than the first predetermined feature value and less than the second predetermined feature value are determined as feature points of the fixed object.

Further, the vehicle may also determine that pixels having a feature value equal to or greater than a third predetermined feature value among the pixels in the third area R3 of the second filter image 191e of the first image are representative feature points of the moving object and determine that pixels having a feature value less than the third predetermined feature value are representative feature points of the fixed object.

Here, the third predetermined feature value may be equal to or greater than the first predetermined feature value and less than the second predetermined feature value.

Further, the third predetermined feature value may also be set based on feature values of representative feature points in the second area.

By differentiating feature points in the third area into feature points of the moving object and the fixed object as described above, a size of the moving object may be prevented from being minimized and a feature point of the moving object may be prevented from being used as a feature point for recognizing a change in position of the vehicle itself.

That is, according to embodiments, a feature point of the moving object may be prevented from being recognized as a feature point of the fixed object by differentiating feature points in the third area. Thus, accuracy in recognizing a change in position of the vehicle itself may be improved.

The vehicle may differentiate objects in the third area of the second filter image 192e of the second image by the same method as the first image.

According to embodiments of the present disclosure, deep-learning is used to detect objects in an acquired image and a feature point of a fixed object of the detected objects is used to recognize a change in position of a vehicle itself so that accuracy in recognizing the change in position of the vehicle itself can be improved and possibility of colliding with an object can be reduced.

That is, according to embodiments of the present disclosure, a position of the vehicle itself is recognized using a more stable feature point so that accuracy in recognizing the change in position of the vehicle itself can be improved and control stability of the vehicle can be improved as a result.

Also, according to embodiments of the present disclosure, an autonomous driving control apparatus first detects an object and determines whether the detected object is dangerous based on a change in position of the vehicle itself so that a preemptive action can be taken at a time point before the vehicle is controlled and an accident rate can be decreased.

According to embodiments of the present disclosure, an outlier can be easily removed even when a distance between the vehicle itself and the moving object is short and the object occupies a large area in an acquired image, and a feature point of only the fixed object in an image from which the moving object has been removed is used to recognize the change in position of the vehicle itself so that an error in recognizing the change in position of the vehicle itself can be reduced.

Also, according embodiments of to the present disclosure, an error in recognition of the change in position of the vehicle itself does not affect recognition of a change in position of the moving object so that the vehicle can be precisely controlled at a time point at which the vehicle needs to be controlled even when moving objects are densely placed at a surrounding of the vehicle itself or placed near the vehicle itself and autonomous driving performance can be improved.

Thus, according to embodiments of the present disclosure, quality and marketability of an autonomous driving control apparatus and a vehicle having an autonomous driving function can be improved. Further, user satisfaction can be improved and competitiveness of the product can be secured.

Although a few embodiments of the present disclosure have been shown and described, those skilled in the art should appreciate that changes may be made to these embodiments.

What is claimed is:

1. An autonomous driving control apparatus provided at a movable apparatus, the autonomous driving control apparatus comprising:
    a storage configured to store a plurality of pieces of data;
    an image acquirer configured to acquire an image of a surrounding; and
    a controller configured to:
        receive a first image and a second image acquired by the image acquirer,
        extract feature points from the first image and the second image,
        detect a moving object from each of the first image and the second image based on the plurality of pieces of data,
        divide an area of each of the first image and the second image into a detection area in which the moving object is detected and a surrounding area of the detection area,
        compare feature points in the surrounding area of the first image with feature points in the surrounding area of the second image to determine an invalid feature point,
        remove feature points of the moving object and the invalid feature point from the feature points of the first image and the second image to acquire valid feature points from each of the images, and
        recognize a position of the movable apparatus based on the valid feature points in the first image and the valid feature points in the second image.

2. The autonomous driving control apparatus of claim 1, wherein the second image includes an image acquired at a time point at which a certain amount of time has elapsed from a time point at which the first image is acquired.

3. The autonomous driving control apparatus of claim 1, wherein the controller is configured to check at least one of line information, pixel information, surface information, shape information, color distribution information, and size information from the first image and the second image, and compare the at least one checked information with the plurality of pieces of data stored in the storage to detect the moving object.

4. The autonomous driving control apparatus of claim 3, wherein the controller uses the at least one checked information to update data of the storage.

5. The autonomous driving control apparatus of claim 3, wherein the controller compares the feature points of the moving object in the first image with the feature points of the moving object in the second image to recognize a change in position of the moving object, and controls driving of the movable apparatus based on the recognized change in position of the moving object.

6. The autonomous driving control apparatus of claim 1, wherein the plurality of data includes image information and state information on a plurality of objects.

7. A vehicle comprising:
    a vehicle body;
    an image acquirer provided in the vehicle body and configured to acquire an image of a road and a surrounding of the road; and
    an autonomous driving control apparatus configured to:
        receive a first image and a second image in real time,
        detect a moving object in each of the first image and the second image based on a plurality of pieces of data which are pre-stored,
        compare the first image and the second image to recognize a change in position of the vehicle body, wherein the moving object is removed from the first image and the second image, and
        control driving on the basis of the recognized change in position of the vehicle body,
    wherein the autonomous driving control apparatus is further configured to:
        divide an area of each of the first image and the second image into a first area in which a fixed object is detected, a second area in which the moving object is detected, and a third area which is a boundary between the first area and the second area,
        extract feature points from the first, second, and third areas of the first image and the second image,
        compare positions of the feature points in the first image with positions of the feature points in the second image for each of the areas to check whether the positions of the feature points change in each of the areas, and
        recognize the change in position of the vehicle body based on the positions of the feature points that change for each of the areas.

8. The vehicle of claim 7, wherein the autonomous driving control apparatus is configured to check at least one of line information, pixel information, surface information, shape information, color distribution information, and size information from the first image and the second image and compares the at least one checked information with the plurality of pieces of data to detect the moving object.

9. The vehicle of claim 7, wherein the autonomous driving control apparatus extracts feature points from the first image and the second image, divides an area of each of the first image and the second image into a detection area in which the moving object is detected and a surrounding area of the detection area, compares feature points in the surrounding area of the first image with feature points in the surrounding area of the second image to determine an invalid feature point, removes feature points of the moving object and the invalid feature point from the feature points of the first image and the second image to acquire valid feature points from each of the images, and recognizes the change in position of the vehicle body based on the valid feature points in the first image and the valid feature points in the second image.

10. The vehicle of claim 9, wherein the autonomous driving control apparatus compares the feature points of the moving object in the first image with the feature points of the moving object in the second image to recognize a change in position of the moving object, and controls driving of the vehicle body based on the recognized change in position of the moving object and the change in position of the vehicle body.

11. The vehicle of claim 7, wherein the autonomous driving control apparatus checks feature values of the feature points in the third area of each of the first image and the second image and determines feature points of the fixed object among the feature points in the third area of each of the first image and the second image based on the checked feature values of the feature points.

12. The vehicle of claim 7, wherein the autonomous driving control apparatus checks feature values of the feature points in the first area and the third area of each of the first image and the second image and determines that feature points having a feature value equal to or greater than a first predetermined feature value among the checked feature values of the feature points are representative feature points of the fixed object.

13. The vehicle of claim 12, wherein the autonomous driving control apparatus compares the representative feature points of the fixed object in the first image with representative feature points of the fixed object in the second image to check whether the representative feature points match, and determines that the representative feature points that match are valid feature points of the fixed object in the first image and the second image.

14. The vehicle of claim 7, wherein the autonomous driving control apparatus determines that feature points having a feature value equal to or greater than a second predetermined feature value among feature values of the feature points in the second area and the third area of each of the first image and the second image are representative feature points of the moving object, and recognizes a change in position of the moving object on the basis of the representative feature points in the first image and the second image.

15. The vehicle of claim 14, wherein the autonomous driving control apparatus compares the representative feature points of the moving object in the first image with representative feature points of the moving object in the second image to check whether the representative feature points match, and determines that the representative feature points that match are valid feature points of the moving object in the first image and the second image.

16. The vehicle of claim 15, wherein, when one or more valid feature points of the fixed object that match a valid feature point of the moving object exist among valid feature points in the third area of each of the first image and the second image, the autonomous driving control apparatus removes the one or more matching valid feature points from the valid feature points of the fixed object.

17. A method for controlling a vehicle for autonomous driving, the method comprising:
  acquiring images in real time;
  selecting a first image and a second image from the acquired images;
  extracting feature points from the first image and the second image;
  detecting a moving object from each of the first image and the second image on the basis of a plurality of pieces of data which are pre-stored;
  removing feature points of the detected moving object from the feature points of the first image;
  removing the feature points of the detected moving object from the feature points of the second image;
  obtaining the first image and the second image from which the feature points of the moving object are removed;
  detecting a fixed object from each of the obtained first image and the obtained second image;
  comparing the first image and the second image from which the feature points of the moving object are removed to recognize a change in position of the vehicle itself; and
  controlling driving on the basis of the recognized change in position of the vehicle itself,
  wherein the recognizing of the change in the position of the vehicle itself includes:
  dividing an area of each of the first image and the second image into a first area in which the fixed object is detected, a second area in which the moving object is detected, and a third area which is a boundary between the first area and the second area;
  extracting feature points from the first, second, and third areas of the first image and the second image;
  comparing positions of the feature points in the first image with positions of the feature points in the second image for each of the areas to check whether the positions of the feature points change in each of the areas; and
  recognizing a change in position of the vehicle itself based on the positions of the feature points that change for each of the areas.

18. The method of claim 17, wherein the recognizing of the change in the position of the vehicle itself includes:
  checking feature values of the feature points in the first area, the second area, and the third area of each of the first image and the second image;
  determining that feature points having a feature value equal to or greater than a first predetermined feature value among the feature values of the feature points in the first and second areas of each of the first image and the second image are representative feature points of the fixed object;
  comparing positions of the representative feature points of the fixed object in each of the first image and the second image to recognize a change in position of the fixed object; and recognizing a change in position of the vehicle itself on the basis of the recognized change in position of the fixed object, and the controlling of the driving includes:

determining that feature points having a feature value equal to or greater than a second predetermined feature value among the feature values of the feature points in the second area and the third area of the first image and the second image are representative feature points of the moving object;

comparing positions of the representative feature points of the moving object in the first image and the second image to recognize a change in position of the moving object; and controlling the driving on the basis of the recognized change in position of the moving object.

* * * * *